(12) United States Patent
Stoica

(10) Patent No.: US 7,155,062 B1
(45) Date of Patent: Dec. 26, 2006

(54) SYSTEM AND METHOD FOR PERFORMING PATTERN MATCHING IMAGE COMPRESSION

(75) Inventor: Adrian Stoica, Potomac, MD (US)

(73) Assignee: Genicom Corp., Gaithersburg, MD (US)

( * ) Notice: Subject to any disclaimer, the term of this patent is extended or adjusted under 35 U.S.C. 154(b) by 0 days.

(21) Appl. No.: 09/442,445

(22) Filed: Nov. 17, 1999

(51) Int. Cl.
*G06K 9/36* (2006.01)
*G06K 9/46* (2006.01)
*H04N 7/12* (2006.01)

(52) U.S. Cl. .................................... 382/232; 382/245
(58) Field of Classification Search ................ 382/232, 382/233, 234, 245, 246, 253; 348/414.1, 348/417.1, 422.1; 375/240.22, 240.25; 355/426.05, 355/426.13; 358/414.1, 417.1, 420.1, 422.1
See application file for complete search history.

(56) References Cited

U.S. PATENT DOCUMENTS

| | | | | |
|---|---|---|---|---|
| 4,783,735 A | 11/1988 | Miu et al. | .................... | 364/200 |
| 5,347,642 A | 9/1994 | Barratt | ........................ | 395/425 |
| 5,450,562 A | 9/1995 | Rosenberg et al. | .......... | 395/446 |
| 5,561,464 A * | 10/1996 | Park | .......................... | 375/240.1 |
| 5,588,136 A | 12/1996 | Watanabe | .................... | 395/187 |
| 5,884,014 A | 3/1999 | Huttenlocher et al. | ...... | 395/114 |
| 5,907,638 A | 5/1999 | Onodera | ...................... | 382/239 |
| 5,923,820 A | 7/1999 | Cunnagin et al. | ............ | 395/108 |
| 5,930,466 A | 7/1999 | Rademacher | ................ | 395/114 |
| 5,936,616 A | 8/1999 | Torborg, Jr. et al. | ......... | 345/202 |
| 5,949,555 A | 9/1999 | Sakai et al. | .................. | 358/462 |
| 6,205,252 B1 * | 3/2001 | Nguyen et al. | .............. | 382/234 |

* cited by examiner

*Primary Examiner*—Yon J. Couso
(74) *Attorney, Agent, or Firm*—McGuireWoods LLP

(57) ABSTRACT

The system and method of the invention provide a method of compressing and decompressing an image by dividing the image into slices and utilizing memory manipulation to enhance the processing of the slices. The method utilizes the presence in an image of a certain gray level or color level remaining constant over a portion or portions of the image. Illustratively, when processing a two-dimensional image W*H, such an image may be divided into slices of dimension w*h. Each slice is represented in the form of a slice-value. In processing slices represented by a slice-value, the contents of the memory are searched for a match. The slice-value may then be encoded using the address in the memory, if a match is present in the memory. The content and organization of the memory may be changed and/or reorganized depending on whether a match is found and at what location in the memory the match is found. Illustratively, the memory may be a cache memory. Additionally, the system and method of the invention, which provide rapid compression and decompression, may be readily used in conjunction with Huffman or run-length compression process, for example, as well as other compression processes.

25 Claims, 15 Drawing Sheets

Two-Dimensional Image

Original Slice-Value Memory

Cache Memory

Compressed image data-base

SYSTEM AND METHOD FOR PERFORMING PATTERN MATCHING IMAGE COMPRESSION

BACKGROUND OF THE INVENTION

1. Field of the Invention

This invention relates to a system and method for compression and decompression of image data.

2. Description of the Related Art

Using conventional methods, there are a wide variety of data compression techniques and methods. Illustratively, using a conventional data compression technique for compressing input data, data is compressed by dealing with data as a set of words. These words have a specific number of bytes. The technique may include allocating a code having a short bit length to a word of high frequency of appearance. Further, the technique may include allocating a code having a long bit length and to a word of low frequency of appearance. As described in U.S. Pat. No. 5,907,638, for example, this allocation may be performed by utilizing deviation in the frequency distribution of words. Huffman coding is a well-known technique using such a compression method.

Accordingly, it should be appreciated that various conventional image compression methods use a variety of processes to achieve high compression ratios. The high compression ratios are achieved through the use of various predication processes. These prediction processes may be coupled with arithmetic, Huffman, or other advanced coding methods. In many conventional methods, image data is processed serially, i.e., one pixel at a time. As a result, software implementations of these techniques are inherently slow.

SUMMARY OF THE INVENTION

Accordingly, the system and method of the invention are directed to an enhanced technique to compression and decompression of image data. In particular, the system and method of the invention provide a technique which is directed to environments where compression and decompression speed may be even more important than the compression ratio. Illustratively, such processes may include document printing or copying. It should be recognized that in such environments, it is common to use bi-level or halftone images. The bi-level tone images use controlled distribution of active (value 1) and inactive (value 0) pixels within small arrays which may be characterized as "cells." The active and inactive pixels (1,0) are used in order to achieve various color levels or gray levels within the image. As a result, adjacent "cells" or groups of adjacent "cells" repeat themselves as long as the color/gray level is constant in portions of the image. The size and shape of the cells may vary within the image. Illustratively, the size and shape of the cells within the image may be varied based on the manner in which the image was initially generated.

The system and method of the invention relies upon the assumption that color/gray level values remain constant or repeat over a portion or portions of the image. Consequently, a number of identical "cells" or groups of "cells" will be clustered in neighborhood areas in an image.

Accordingly, the system and method of the invention provide a method of compressing and decompressing an image by dividing the image into slices and utilizing memory manipulation to enhance the processing of the slices. The method utilizes the understanding that in an image, the gray level or color level remains constant over a portion or portions of an image. An image may be characterized as having a width W and a height H. Illustratively, when processing the two-dimensional image W*H, such an image may be divided into slices of dimension w*h in accordance with the system and method of the invention. Each slice, which contains image data, is then represented in the form of a slice-value.

The slice-value is then compared to the contents of a memory such as a cache memory, for example. This comparison is performed to determine if there is a match. If there is a match, the slice-value is encoded using an encoded-value to compress the image and to enhance the speed of processing additional slices having the same slice-value. The encoded-value is the address in the memory at which the match was found. Thus, either the slice-value or the encoded-value, is output and stored in a compressed memory.

Accordingly, once a specific slice-value is encoded in the memory, in processing of subsequent slices, the contents of the memory are searched for a match. The content and organization of the memory may be changed and/or reorganized depending on whether a match is found and at what location in the memory the match is found.

The system and method of the invention provide rapid compression and decompression and may readily be used in conjunction with Huffman or run-length encoding compression process, for example, as well as other compression processes.

BRIEF DESCRIPTION OF THE DRAWINGS

These and other aspects of the invention will become apparent from the following description which illustrate exemplary embodiments of the invention when read in conjunction with the accompanying drawings, in which.

DETAILED DESCRIPTION OF THE INVENTION

Figure 1:
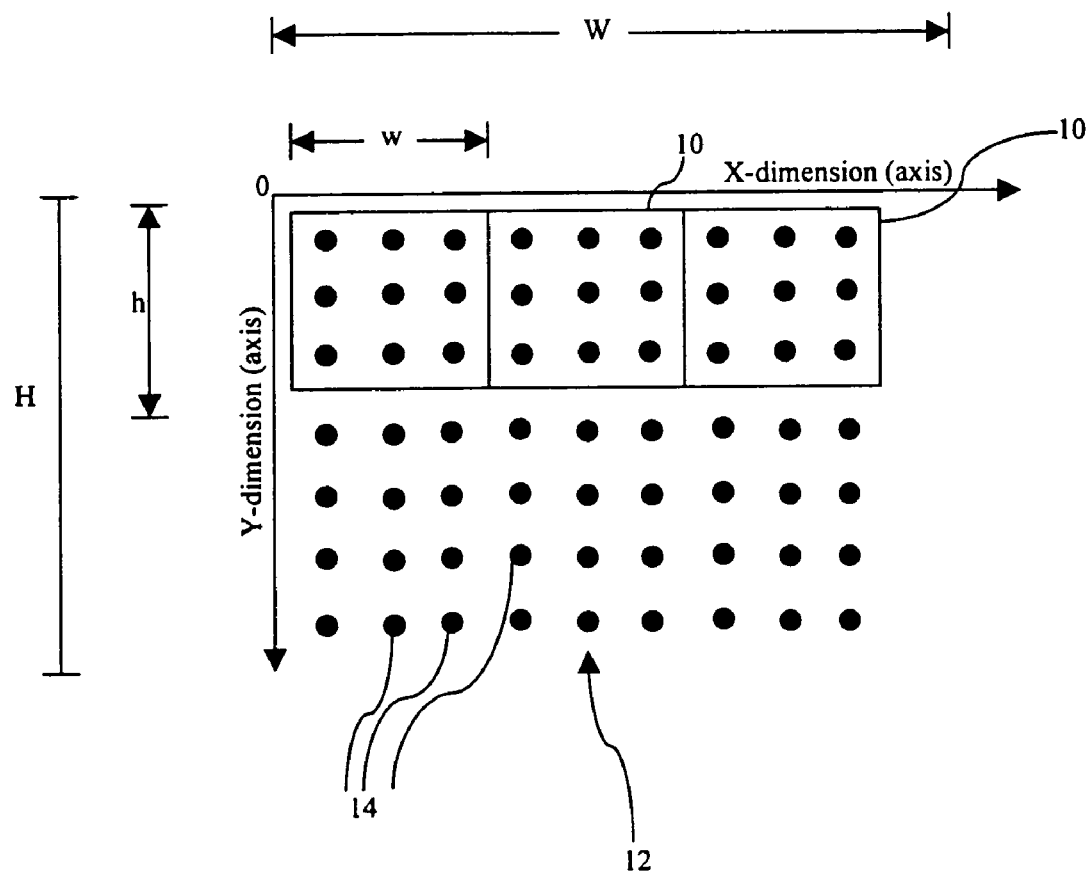
FIG. 1 is a diagram showing an image in which the pixels are clustered in accordance with the system and method of the invention.

With reference to the accompanying drawings wherein like numbers have been used to represent like features, FIG. 1 shows a two-dimensional digital image 12. The image 12 is represented by a series of pixels 14 arranged along a plurality of raster lines. Each pixel 14 possesses a color value. Illustratively, a one-bit digital image can have color value of "1" or "0," for example. A "1" represents black and a "0" represents white, as described above.

Illustratively, FIG. 1 illustrates a digital image containing nine columns by seven rows of pixels, i.e., a 9*7 pixel image. In further explanation, as shown in FIG. 1, the image 12 may be characterized as forming an array containing W*H pixels, where:

W is the number of pixels in a line, i.e., the image width, and

H is the number of lines in the image, i.e., the image height.

In accordance with the system and method of the invention, it is recognized that an image is made up of image cells, as described above. These image cells commonly result from the process used to initially generate the image. It should be recognized that the size and shape of the cells vary within the image. However, the system and method of the invention rely upon the assumption that color/gray level values remain constant or repeat over a limited portion or portions of the image. Consequently, the invention relies upon the assumption that a number of identical "cells" or groups of "cells" will be clustered in neighborhood areas or portions in an image.

As shown in FIG. 1, the image 12 contains a plurality of pixels 14. These pixels 14 may be broken down into a plurality of clusters or arrays 10, in accordance with the system and method of the invention. That is, in accordance with the invention, the image 12 may be divided into a plurality of clusters 10, wherein each cluster contains 3 adjacent rows and 3 adjacent columns. These clusters 10 are hereinafter respectively referred to as a "slice" 10 of neighboring pixels.

Thus, each slice 10 as shown in FIG. 1 contains nine pixels 14. However, it should be recognized that the particular size and shape of the slice may vary depending on the particular application of the method of the invention. The slice may contain more or less than nine pixels, for example. Also, it is not necessary that the slice be square, i.e., contain the same number of pixels both in the vertical and horizontal direction. The slices may be rectangular or some other appropriate shape, for example.

However, it should be appreciated that a slice will preferably contain pixels that are from the same area of the image, i.e., pixels that are adjacent to one another. Further, adjacent slices should preferably be formed of pixels from adjacent areas of the image. Thus, one slice is preferably not formed from some pixels that are on the far left of the image and some pixels that are on the far right of the image, i.e., pixels which might be on the next raster line, for example. Accordingly, the choice of W/w being an integer value, as well as H/h being an integer value, will result in processing that will be beneficial in this respect. Also, in this respect, it may be beneficial for each band, as described herein, to possess an integral number of lines such that H/h can result in an integer number. The invention will hereinafter be described in conjunction with FIG. 2.

Figure 2:
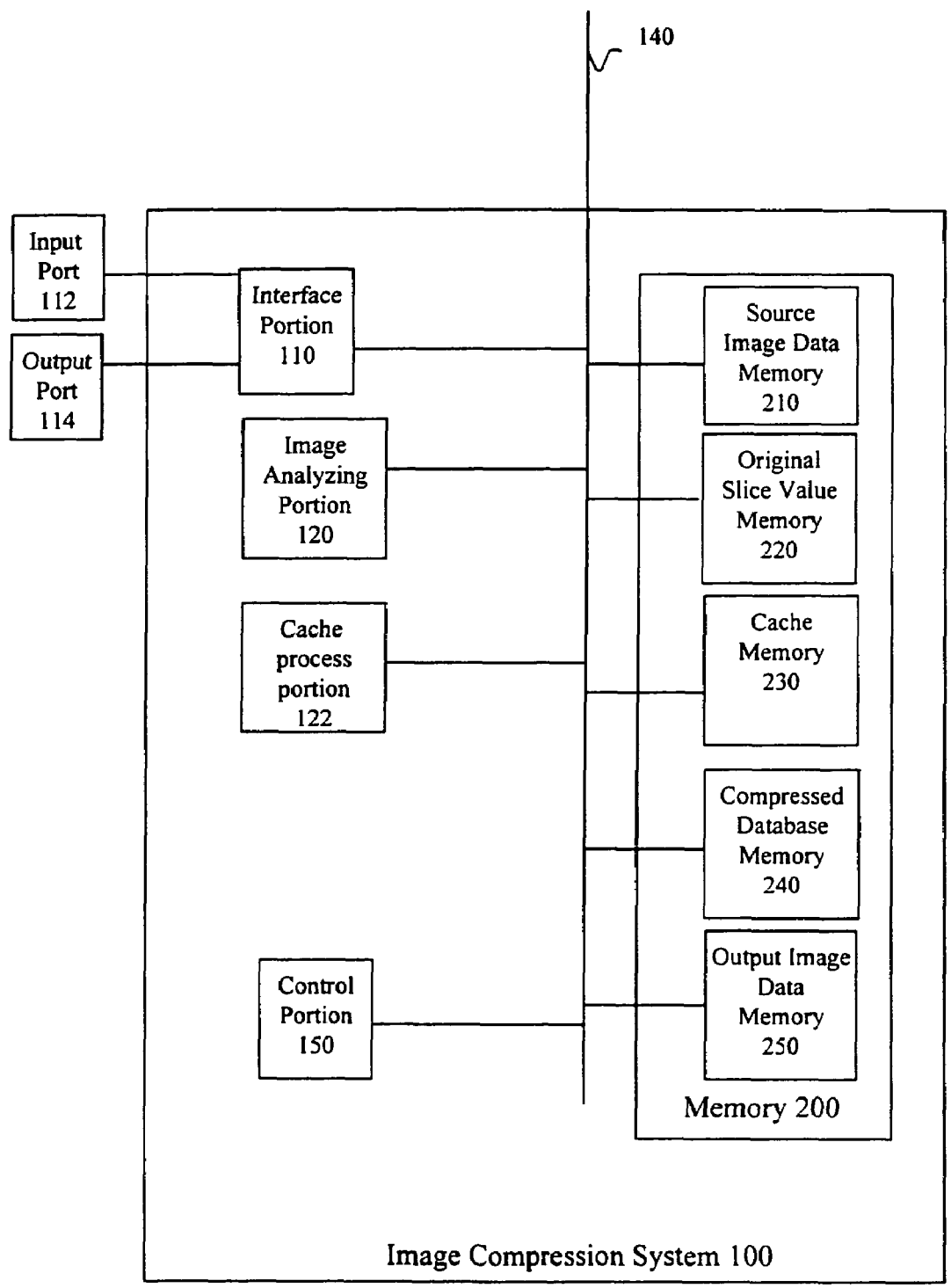
FIG. 2 is a block diagram showing an image compression system in accordance with the system and method of the invention.

FIG. 2 is a block diagram showing an embodiment of an image compression system 100 in accordance with the system and method of the invention. The image compression system 100 processes source images to perform compression and decompression of the image. The image compression system 100 includes an interface portion 110 and a control portion 150. The image compression system 100 receives and outputs data using the interface portion 110. The interface portion 110 includes both an input port 112 and an output port 114 for receiving and sending image data, respectively. The control portion 150 controls the operation of the various components and portions in the image compression system 100.

Additionally, the image compression system 100 includes an image analyzing portion 120, a cache process portion 122, and a memory 200. The memory 200 includes a source image data memory 210, an original slice-value memory 220, a cache memory 230, a compressed database memory 240 and an output image data memory 250.

The source image data memory 210 is used by the control portion 150 to input and store image data, which is to be compressed in accordance with the invention. Each of the original slice-value memory 220, the cache memory 230 and the compressed database memory 240 serve respective roles in the image compression/decompression process of the invention, as described below. The original slice-value memory 220 stores image data subsequent to initial processing. The cache memory 230 serves as a variable memory store to enhance the processing efficiency and speed in accordance with the system and method of the invention. The compressed database memory 240 serves to store compressed image data.

Also, the output image data memory 250 provides a storage area for image data that has been processed by the image compression system 100. Further, the connection interface 140 connects the various portions and components of the image compression system 100, as shown in FIG. 2.

As shown in FIG. 2, the image compression system 100 is in the form of a computer system. However, it should be recognized that the image compression system 100 may be implemented on any of a wide variety of computers or operating systems. Also, any of a wide variety of programming languages may be used such as "C" programming language, for example. The image compression system 100 may utilize hardware or software components as is necessary or desired. Further, the memory 200, as well as each of the memory components in the memory 200, may be in the form of a hard drive, a floppy drive or any other of a wide variety of memory devices and file systems, including cache memory, suitable for data processing in accordance with the system and method of the invention.

In the embodiment of the invention shown in FIG. 2, the image compression system 100 includes a cache memory 230. A cache memory is a form of high speed storage. For example, the cache memory may be a section of the main memory of a computing system. Alternatively, the cache memory may be an independent storage device (outside an operating system). A cache memory is utilized in operating environments when the same data or operating instructions are repeatedly used. As a result of utilizing the cache memory, the overall processing speed of the operating system is improved.

In particular, in accordance with the system and method of the invention, the cache memory is used to establish a precise mapping of the slice value into encoded-values, as well as to establish a precise mapping of the encoded-values back into corresponding slice-values. Also, the cache is used to detect repeating sequences of slices in an image to be compressed It should be appreciated that the memory utilized in implementation of the invention does not have to be a cache memory. As described above, a cache memory may be most suitable in some operating environments. However, any suitable memory system or device may be used depending on the particular application of the system and method of the invention.

Further, it should be recognized that the system and method of the present invention may be utilized in a wide variety of applications or operating environments. For example, the system and method for image compression may be used in a printing or photocopy process or device, for example.

As described above, FIG. 1 shows an image 12, which contains a plurality of pixels 14. The image compression system 100 may input the image using the input port 112 and the interface portion 110, and thereafter store the image data in the source image data memory 210. However, it should be appreciated that the image 12 does not have to be input into the image compression system 100. That is, the image 12 may be obtained from any suitable source. For example, the image 12 may be internally created in the image compression system 100 and, as a result, may be stored in the source image data memory 210 immediately upon generation.

In accordance with the system and method of the invention, once the image 12 is input or in some other way retrieved from memory, the image analyzing portion 120 in the image compression system 100 divides the original image 12.

Specifically, the image analyzing portion 120 divides the array W*H into smaller arrays of w*h pixels of neighboring pixels, i.e., slices of pixels. Specifically, the image analyzing portion 120 generates each slice by first dividing the original image into bands of h horizontal lines. It should be appreciated that the last band in the image may be padded with "white" lines if necessary, or padded in some other suitable manner. These white lines may be 0 pixels, for example The total number of bands in the image 12 is thus $N_b=(H+r)/h$, where:

$N_b$ is the total number of bands in the image,
H is the total number of horizontal lines in the image,
r is the number of padding lines for the last band, and
h is the number of horizontal lines in each band.

After dividing the image 12 into bands, the image analyzing portion 120 then vertically slices each respective band. Specifically, the image analyzing portion 120 vertically slices each band at multiples of w pixels. The image analyzing portion 120 may also use padding when vertically slicing the bands. As a result of (1) creating the bands, and (2) slicing the bands, the image analyzing portion 120 creates slices 10 from the image 12.

Once the image analyzing portion 120 creates the slices, the image analyzing portion 120 then transforms the image information in each slice into a form that will be better manipulated or processed. Illustratively, the image analyzing portion 120 concatenates the pixel information for each portion of the horizontal lines, i.e., each pixel, that is included in a respective slice. Specifically, the image analyzing portion 120 concatenates the pixel information that make up a slice. The concatenation is performed in a predetermined order going from left to right and top to bottom, for example. The concatenation is generated by the image analyzing portion 120 to form a contiguous word, for example, of width w*h, which represents the pixel data in a slice 10. This representation of the slice data may be in any form suitable for memory storage and manipulation. Illustratively, the representation of the slice data may be in the form of a word suitable for cache memory manipulation. As a result, it should be recognized that the 2-dimensional slice or image rectangle is translated into a 1-dimensional value. The 1-dimensional value may be characterized as a slice-value.

As noted above, it may be necessary to pad the image in either the horizontal or the vertical direction. However, it should be recognized that it may be necessary or desirable to avoid padding the image. Accordingly, in order to avoid padding at the end of a band, for example, w might be chosen such that "W/w" yields an integer number.

Accordingly, the image analyzing portion 120 slices each band starting from the same side, i.e., in the same direction. Additionally, the image analyzing portion 120 processes the slices in the order that they are produced. The number of slices within a band is $N_{sb}=W/w$, where:

$N_{sb}$ is the number of slices within a band,
W is the number of pixels in a line, and
w is the number of pixels along the width of the slice.

Accordingly, the number of slices $N_s$ for the entire image is:
$N_s=N_{sb}*N_b=W/w*((H+r)/h)$, assuming no padding is used in slicing the bands.

As discussed above, it should be recognized that in any given image, the image is made up of repeating color/gray level cells. Further, it should be recognized that the repeating color/gray level cells that compose the image may be varied from one portion of the image as compared to another portion of the image, for example. Accordingly, the repeating color/gray level cells that compose the image have, in general, a width $C_w$. This width may likely be different than the slice width w.

To further explain, the process of "slicing" performed by the image analyzing portion 120 may produce repeating sequences of slices. Illustratively, A, B and C may be used to represent respective types of slices. The process of slicing the image may generate a repeating sequence of slices A-A-B-C.

To further explain the manner in which the repeating sequences are generated, as noted above, repeating color/gray level cells that compose an image have, in general, a width $C_w$, which is different than the width of the slice w. The process of slicing produces repeating sequences of slices, wherein the length of the sequence, i.e., how many slices are in the sequence, may be designated as n. Also, the number of color/gray level cells may be characterized as m. Illustratively, the slice width is w=4 pixels and the cell width is $C_w$=14 pixels. Thus, the length of the sequence may be characterized as: $n*w=m*C_w$, where n and m are the smallest numbers that satisfy the relationship. That is, the smallest numbers that satisfy the relationship is m=2 and n=7. Accordingly, the length of the sequence will be 7 slices or 28 pixels. Also, 2 (m=2) original image cells will be present in such a sequence.

Accordingly, in accordance with the system and method of the invention, the image analyzing portion 120 generates slice-values, which represent each slice in the image 12. The slice-value has a length of w*h, for example. However, it should be appreciated that the specific manner in which the slice information is retained may be in any of a wide variety of forms. That is, the slice information may be stored in any form that is suitable for memory storage and manipulation.

In this illustrative embodiment of the invention, a cache memory 230 is used in the image compression system 100. However, it should be appreciated that it is not necessary to implement the system and method of the invention using a cache memory. While a cache memory may be particularly beneficial in some operating environments as also noted above, any suitable type of memory may be utilized.

Figure 3:
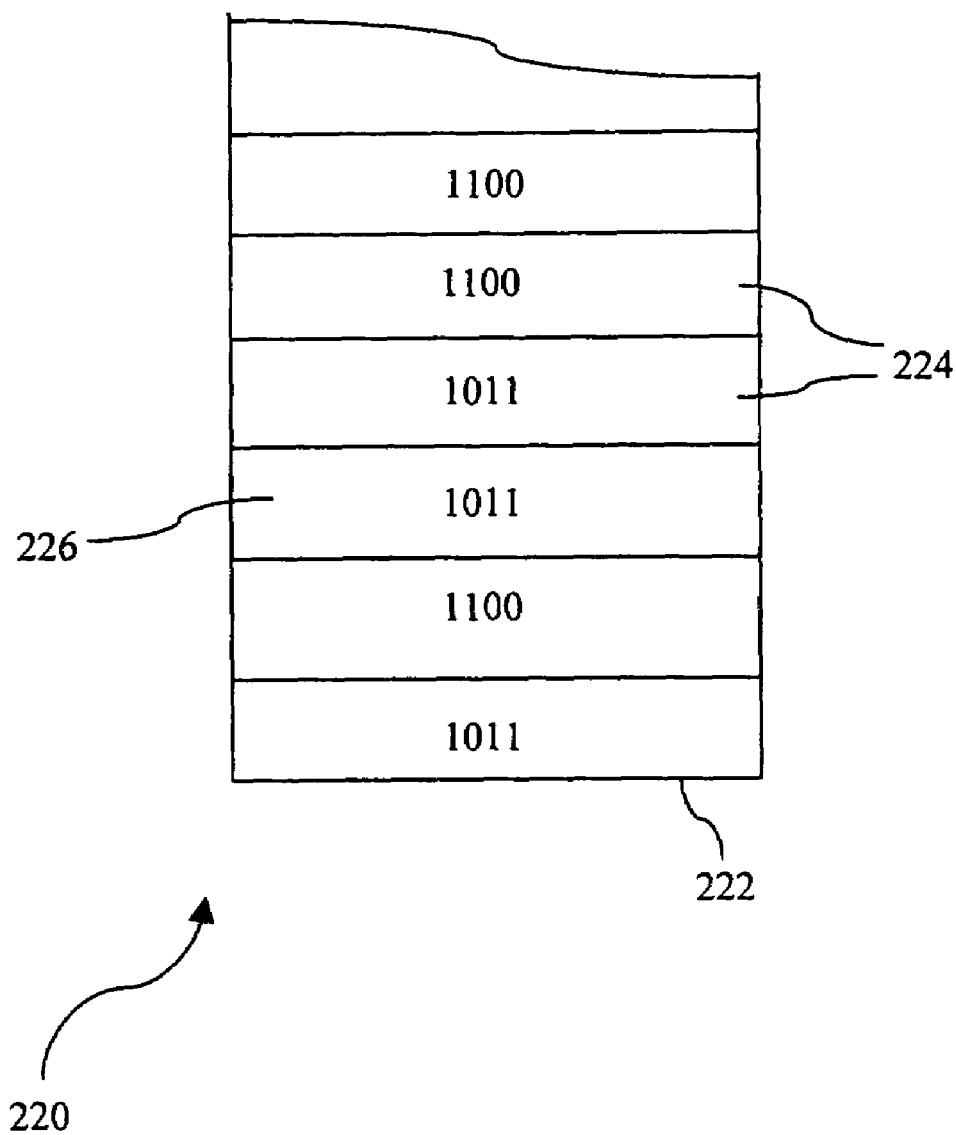
FIG. 3 is a diagram showing an original slice-value memory in accordance with the system and method of the invention.

FIG. 3 shows in further detail the original slice-value memory 220 shown in FIG. 2. As shown in FIG. 3, the original slice-value memory 220 may be in the form of a database 222 which may be used in conjunction with the system and method of the invention. The database includes original data cells 224. The original data cells 224 in the database 222 contain uncompressed data obtained from each respective slice in the input image 12. Specifically, the original slice-value memory 220 contains original slice-values 226 obtained from the image 12. The operation and manipulation of data within the original slice-value memory 220 will be described below in further detail.

As described above, the image analyzing portion 120 generates slice-values to represent each slice in the input image 12. As the image analyzing portion 120 generates these representative slice-values, each slice-value is input into the database 222 in order. In accordance with one embodiment of the invention, the image analyzing portion 120 transforms each slice in the input image 12 into the form of a slice-value before any further processing is performed on the slice-values.

However, it should be recognized that each slice-value may be processed by the image compression system 100 as that slice-value is generated by the image analyzing portion 120. Such processing may be preferable in applications where processing time is of importance. As a result, the slice-value, subsequent to generation by the image analyzing portion 120, may not be stored at all, but may be processed immediately by the image compression system 100. However, for purposes of clarity of explanation, the system and method of the invention have been explained with the use of the original slice value memory 220.

Figure 4:
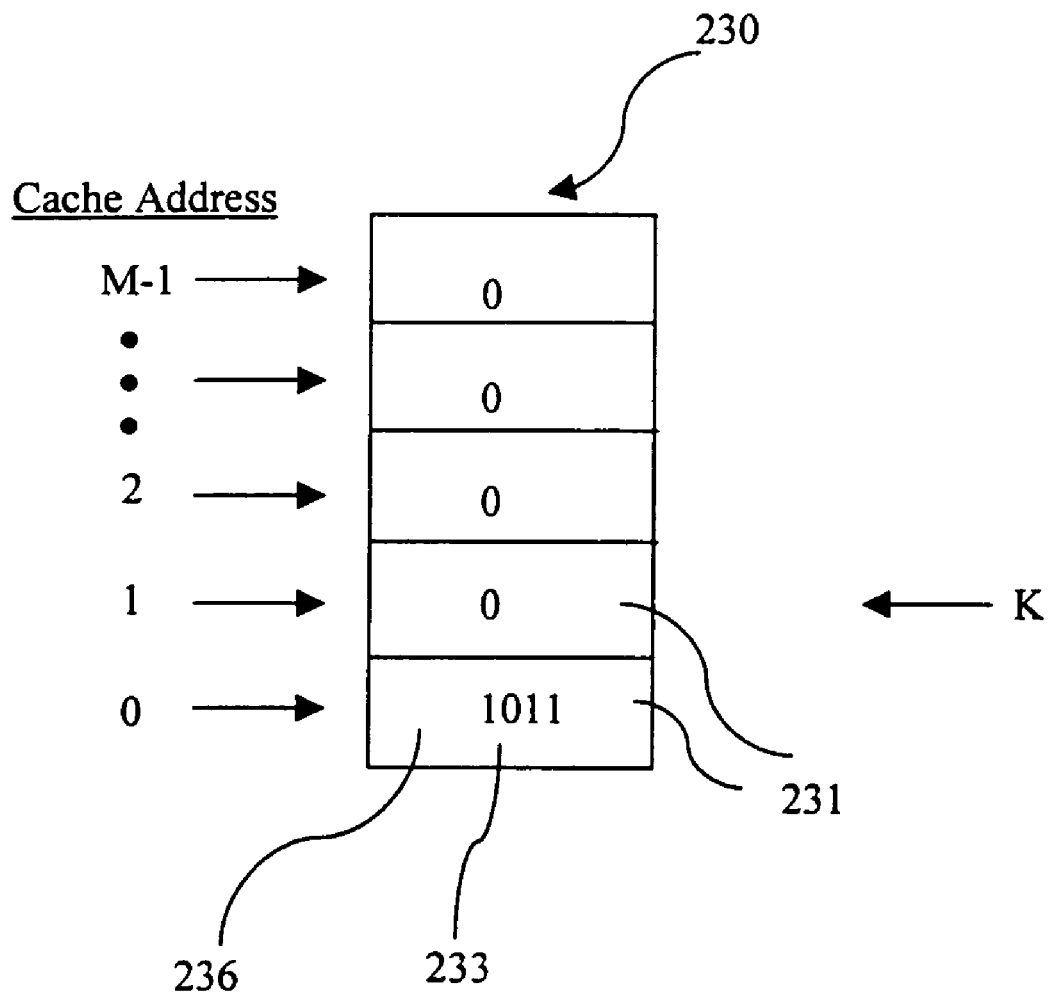
FIG. 4 is a diagram showing a cache memory in accordance with the system and method of the invention.

In accordance with the system and method of invention, the image compression system utilizes a cache memory 230, as shown in FIG. 2. FIG. 4 shows in further detail the cache memory 230. The cache memory 230 includes a plurality of cache elements 231. It should be recognized that in accordance with the invention, the cache memory 230 contains only slice-values.

As shown in FIG. 4, each cache element 231 may be identified by a cache address. As shown in FIG. 4, a cache element 231 at the lowermost cache address in the cache memory 230 will have a cache address of 0, i.e., a 0 cache address. The cache element 231 immediately above the lowermost cache element 231 will have a cache address of 1, i.e., a 1 cache address. If the cache memory 230 possesses space sufficient to retain M cache elements, then the topmost cache address in the cache memory 230 will be the M−1 cache address. In other words, the cache addresses in the cache memory range from 0, i.e., the lowest cache address in the cache memory, to the cache address "M−1", i.e., the highest cache address in the cache memory 230.

Figure 5:
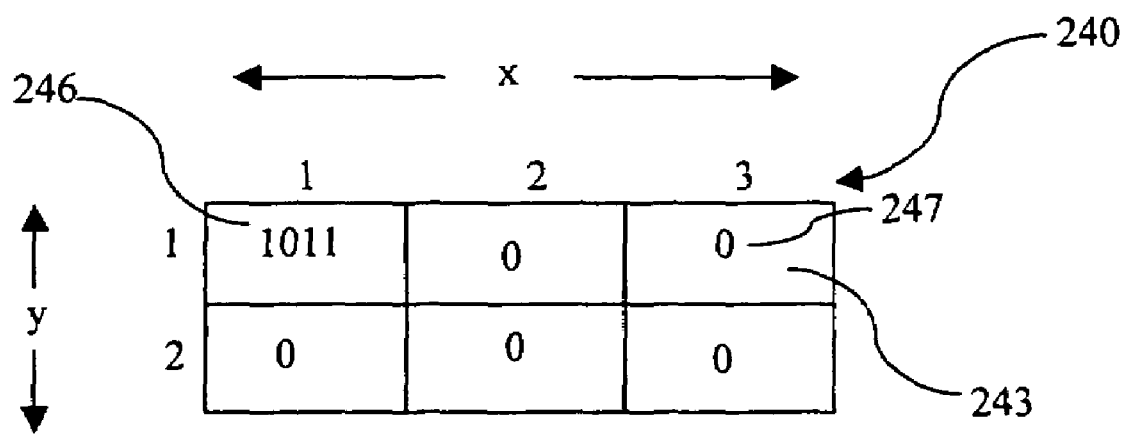
FIG. 5 is a diagram showing a compressed image database memory in accordance with the system and method of the invention.

In accordance with the system and method of the invention, a compressed database memory 240, as shown in FIG. 2, is used to store the compressed data subsequent to processing. FIG. 5 shows an illustrative embodiment of the compressed database memory 240 in further detail. However, it should be recognized in any of a wide variety of database architectures may be used in the invention and that the specific architecture as shown in FIG. 5 is merely illustrative.

The compressed database memory 240 as shown in FIG. 5 is constructed of a plurality of compressed database cells 243, as described above. In accordance with the processing of the invention, each individual compressed database cell 243 in the compressed database memory 240 corresponds to one and only one slice 10 in the input image 12, as shown in FIG. 1. Additionally, each compressed database cell 243 in the compressed database memory 240 contains one of two types of values. That is, the compressed database cell 243 may contain a compressed database encoded-value 247, as described above. Alternatively, each compressed database cell 243 may contain a compressed database slice-value 246. A compressed database slice-value 246 is the slice-value which represents the image information in a corresponding slice. Alternatively, a compressed database encoded-value 247 may be mapped to a slice-value. This mapping is performed using an address and slice-value in the cache memory 230 as described below.

As described above, slices in the input image 12 are processed in sequential order. However, it should be recognized that there is no particular restriction or requirement regarding the order in which the bands of slices are processed. However, it is necessary that slices be effectively processed in the same order in the compression process as in the decompression process.

In accordance with this embodiment of the system and method of the invention, the invention uses the original slice-value memory 220, the cache memory 230 and the compressed database memory 240. The original slice-value memory 220 contains only slice-values obtained from a source image. The cache memory 230 also contains only slice-values. The compressed database memory 240 contains both slice-values and encoded-values. The encoded-values use the addresses and contents of the cache memory 230 to map back to corresponding slice-values.

In this implementation of the invention as shown in FIGS. 3–6, it should be appreciated that the slice-value associated with a particular slice from a source image does not change as such information is transferred between the original slice-value memory 220, the cache memory 230, and the compressed database memory 240. However, in order to facilitate the understanding of the invention a slice-value in the original slice-value memory 220 has been referred to as an original slice-value 226. A slice-value in the cache memory 230 has been referred to as a cache slice-value 236. A slice-value in the compressed database memory 240 has been referred to as a compressed database slice-value 246. This distinction has been utilized where such is believed helpful.

Hereinafter, the image compression process in accordance with system and method of the invention using the image compression system 100 will be further described. As described above, the image analyzing portion 120 stores image data in the form of slice-values, which represent each slice of the input image 12. This image data is initially stored in the original slice-value memory 220. In accordance with the invention, the cache process portion 122 manipulates the image data in order to compress the data.

Illustratively, in accordance with the system and method of the invention, the cache process portion 122 may initiate the compression process by initiating each cache element 231 in the cache memory 230 to contain zeros. Then, the cache process portion 122 may start with the original slice-value 226 at the lowermost data cell as shown in FIG. 3. At this address, the slice-value is 1010, for example. In accordance with the invention, the cache process portion 122 first checks this slice-value obtained from the original slice-value memory 220 against the cache memory 230 shown in FIG. 4. Specifically, the cache process portion 122 determines whether there is a match between the current original slice-value 226, i.e., the slice-value currently being processed, and any of the cache slice-values 236 in the cache memory 230. The initial step or steps performed by the cache process portion 122 in the compression process may be characterized as the "step 1 compression process."

In accordance with the invention, the cache process portion 122 initiates this comparison process, for each slice, by starting with the cache address of the "current-encoded cache slice-value 236" in the cache memory 230. This cache address will hereinafter be referred to as the "base cache-address." To explain, the cache memory 230 contains a number of slice-values at any given time in the compression process, as well as in the decompression process. In accordance with the invention, one variable in image compression is at which address in the cache memory 230 is the "current-encoded cache slice-value 236," i.e., which address in the cache memory is the "base cache-address." This changes as the processing of the invention is performed, as is described in detail below. For example, in some scenarios, the address of the current-encoded cache slice-value 236 is dictated by the address at which the most recent match was found.

To explain further, the difference between a "base cache-address" and a "current-encoded cache slice-value 236" as used herein should be appreciated. The "current-encoded cache slice-value" is an actual slice-value in the cache memory. This actual value is compared with a current slice-value being processed, i.e., retrieved from an image to be compressed. In this embodiment, this actual value is the first to be compared with a current slice-value being processed In contrast, the "base cache-address" is an address in the cache memory. For example, the cache encoded-value could have the value 0, 1, 2 . . . (M−1). It is this address that may be output to the compressed memory in the compression process of the invention. Then, when later decompressing, this stored address is used to, in a sense, back-track out of the compression process. The base cache-address contains the current-encoded cache slice-value.

Accordingly, the cache process portion 122, as a first comparison, compares the current slice-value being processed with the current-encoded cache slice-value 236 in the base cache-address. If a match is not found, the cache process portion 122 then continues looking for a match starting at the 0 cache address in the cache memory 230, unless the current-encoded cache slice-value 236 was at the 0 cache address in which case the cache process portion 122 continues looking for a match starting at the 1 cache address.

Thus, if a match is not found at the 0 cache address, the image analyzing portion 120 works upward in the cache memory 230. It should be recognized that the most common sequences of slices in an image have relatively short lengths, i.e., there are commonly a limited number of different slice-values in a sequence of slices. Accordingly, this proposed direction of search produces a rapid attainment of a match with some applications of the invention. However, it should be recognized that the specific direction of search may be varied, so long as there is consistency in the direction of searching between the compression and decompression processes.

It should be recognized that for lossless compression, an exact match is required between the original slice-value 226 and the cache slice-value 236. However, the method of the invention allows for lossy compression as well. If lossy compression is acceptable, then an approximate match is accepted when the exact match fails. The definition of the "approximate match" may vary and will depend on the particular application. Any of a wide variety of conventional processes and techniques may be utilized to determine when an approximate match is obtained.

It should be appreciated that in an image, a slice may not exactly repeat itself. Rather, it should be recognized that while the slices may not perfectly repeat themselves, the image may contain sub-sequences of repeating slices. As noted above, one reason for this is the difference in size between the image cells, created when the image was generated, and the size of the slices 10. Based on this recognition, a "K cache address" is used in the process of the invention. To explain, the utilization of the K cache address is intended to aid in the detection of slice sequences that may contain sub-sequences of repeating slices. As noted above, the K cache address may vary depending on the slice width w, as well as other parameters. Accordingly, the particular K address may vary depending on the particular application of the method of the invention. In the development of the invention, it was determined that for a slice width w=4, a K cache address of 2 was found to be adequate. For purposes of illustration, FIG. 4 shows a K cache address of 1.

In further explanation of the system and method of the invention, if the cache process portion 122 does not find a match in the cache memory 230, then the cache process portion 122 performs additional processing in accordance with compression process step 2, as described in detail below.

Alternatively, if the cache process portion 122 finds a match in the cache memory 230, then the cache process portion 122 performs additional determinations. Specifically, assuming a match, the cache process portion 122 may determine that the matching cache address is 0.

If the matching cache address in the cache memory 230 is 0, then the cache process portion 122 further determines if the cache slice-value 236 at the cache address "K" matches the current original slice-value 226. If the cache slice-value at cache address "K" does "not" match the current slice-value, then the process proceeds to the "step 3 compression process," as described below. Alternatively, if the cache process portion 122 determines that the cache slice-value at the cache address "K" does match the current slice-value, then the process proceeds to the "step 4 compression process," as is also described below.

Alternatively, the cache process portion 122 may find a match between the current slice-value and a cache slice-value at a cache address in the cache memory, which is not at the 0 cache address. If the cache process portion 122 determines a matching cache address that is not at the 0 cache address, then the process also proceeds to step 4 compression process.

Further, as described above, the cache process portion 122 may be unsuccessful in finding a match between the current slice-value and a cache slice-value 236 in the cache memory 230. As a result, the current slice-value, i.e., the slice-value currently being processed, can not be encoded using a cache address. As a result, the cache process portion 122 proceeds to "compression process step 2" as described below.

Accordingly, the above description describes the initial steps performed in the step 1 compression processing. Hereinafter, steps 2–4 of the compression processing will be described. One and only one of compression process steps 2–4 is performed with any one slice-value processed.

In accordance with compression process step 2, the 122 outputs the current slice-value to the compressed image database 240 as an unencoded slice-value. The 122 then shifts the content of the cache memory 230 upwards one cache address, which results in the highest memory cache address in the cache memory being discarded. Then, the 122 stores the current slice-value in the cache memory at cache address 0. The base cache-address is set to 0, i.e., the cache address which will be compared to first when the next slice-value is processed. The 122 then proceeds to retrieve an additional slice-value from the original slice-value memory 220 for processing.

In further explanation of aspects of the system and method of the invention, in accordance with the step 3 compression process, the cache process portion 122 determines that the matching cache address in the cache memory 230 is 0, but that the memory content at cache address K in the cache memory does not match the current slice-value, i.e., the cache slice-value 236 at the 0 cache address in the cache memory.

It should be recognized that the presence of a different cache slice-value 236 in the 0 cache address of the cache memory vis-a-vis the cache slice-value 236 at the K cache address in the cache memory is suggestive that the slice-values may be repeating in a certain sequence. As a result, the cache process portion 122 performs two operations.

The cache process portion 122 initially outputs the "cache encoded-value" which is 0, i.e., the cache process portion 122 outputs the value "0," to an appropriate compressed database memory. As a result, the cache process portion 122 effectively compresses the data necessary to represent the current slice-value. Additionally, the cache process portion 122 attempts to capitalize on a possible repeating sequence of slice-values. That is, the memory content of the cache element 231 at 0 cache address is moved to the first cache address location, i.e., the K cache address, while a duplicate entry is created at the 0 cache address in the cache memory 230. Thus, all cache locations are shifted up, while a duplicate entry is created at address 0. As a result, the cache process portion 122 improves detection of long sequences that may contain multiple copies of the same slice-value. In the compression process step 3, the "base cache-address" is set to zero, i.e., the cache address which will first be compared to when a new slice-value is processed is the zero cache address.

As described above, the image analyzing portion 120 proceeds to the step 4 compression process in accordance with the system and method of the invention under two circumstances. The first circumstance is when a match is found, the matching cache address is 0, and the memory content at the K cache address does match the slice-value. The other circumstance in which the process proceeds to step 4 compression process is when a match is found and the matching cache address is not 0.

In accordance with step 4 compression process, the cache process portion 122 has determined that a cache slice-value 236 in the cache memory 230 matches the current slice-value obtained from the original slice-value memory 220. The cache process portion 122 outputs the cache encoded-value, i.e., the cache address at which the match was found, to an appropriate compressed database. In other words, the cache process portion 122 outputs the encoded-value of the slice.

The cache process portion 122 has previously determined, in step 1, whether the matching cache slice-value 236 is at the 0 cache address. If the matching cache slice-value 236 is at the 0 cache address, then this iteration of the process is complete and the cache process portion 122 retrieves another slice-value for processing.

Alternatively, if the matching cache slice-value 236 is not at the 0 cache address, then, the further steps of step 4 compression process are performed. Specifically, in accordance with the system and method of the invention, the current original slice-value 226 possesses a high probability to be the first of a sequence of slices. Accordingly, there is no need to store additional slices in the cache memory 230. Rather, the cache process portion 122 merely creates a presumed slice sequence in the cache memory. This is achieved by shifting up the content of the cache memory. The shift is, however, limited to the cache addresses below the matching cache address. This approach will produce the same output for all slices that comprise a sequence. Further, this approach speeds up compression, as fewer memory cache addresses need to be changed.

Additionally, in the step 4 compression process of the invention and if the matching cache address is not zero, the content of the matching cache address containing the matching cache slice-value 236 is moved to the 0 cache address. It should be recognized that while locations are changed, no new slices are stored into the cache memory 230, and no location is discarded.

In compression process step 4, the base cache-address is set to be the cache address at which the match is found. Thus, if the match was found at the 0 cache address, the base cache-address is set to 0. This means that the next slice-value to be processed will first be compared with the slice-value in the 0 address. This slice-value has been referred to as the "current-encoded cache slice-value" above.

Alternatively, if the match was found at the cache address 2, for example, then the base cache-address is set to 2. This means that the next slice-value to be processed will first be compared with the slice-value in the 2 cache address.

Then, the cache process portion 122 repeats the process for an additional slice-value starting with compression process step 1. That is, the cache process portion 122 obtains the slice-value information for a new slice. Accordingly, the process of the invention is repeated until all the slices in the image are processed.

Accordingly, compression process steps 1–4 are described above. Hereinafter, the system and method of the invention will be further described with additional reference to FIGS. 3–5. As well as FIG. 6.

Figure 6:
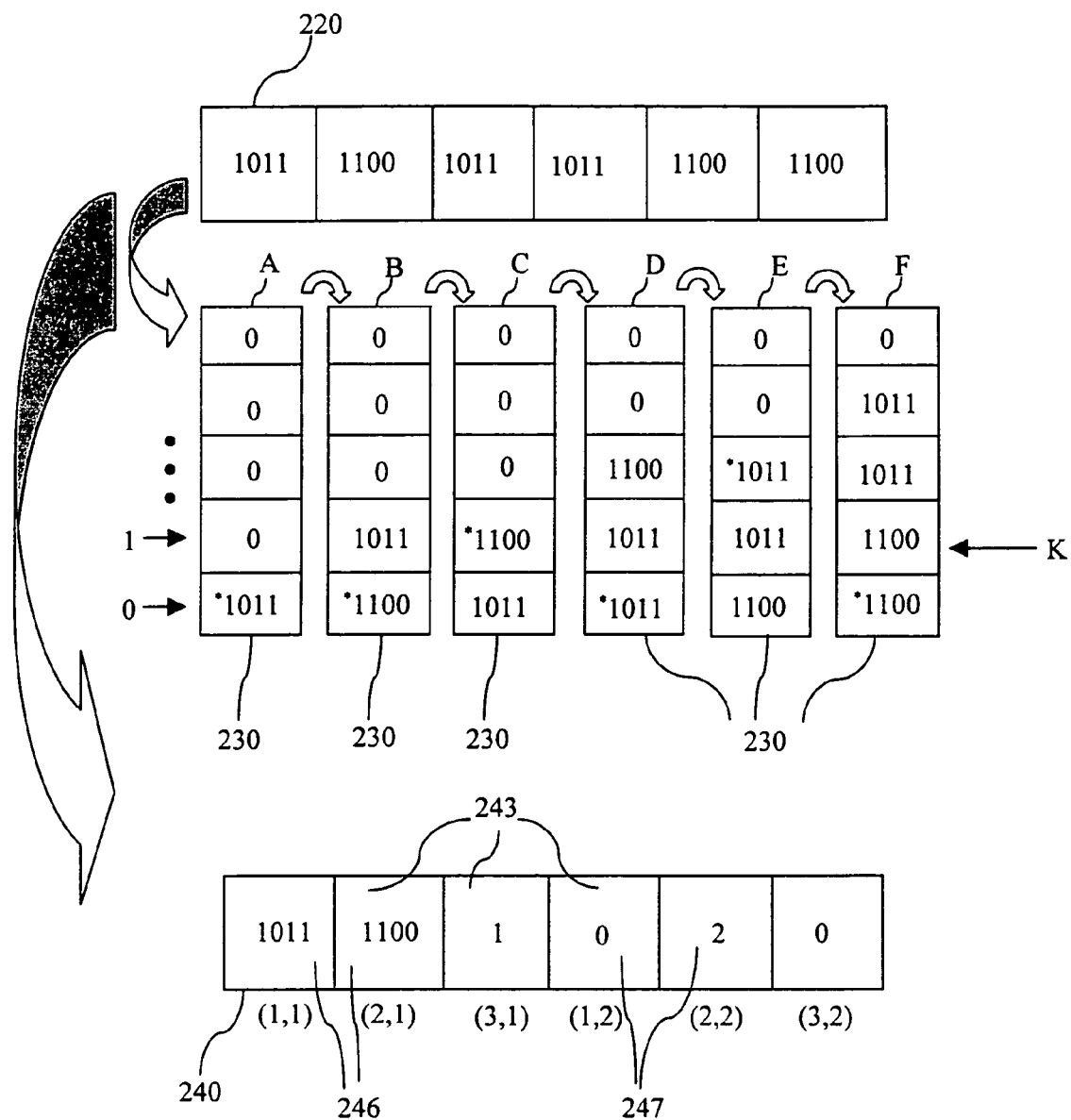
FIG. 6 is a diagram showing an original slice-value memory, a cache memory and a compressed image database memory in accordance with the system and method of the invention.

FIG. 6 further illustrates the system and method of the invention and shows embodiments of the original slice value memory 220, the cache memory 230 and the compressed database memory 240. Specifically, FIG. 6 shows the compressed database memory 240 with the same original slice-values as shown in FIG. 3. Also, FIG. 6 shows the same cache memory 230 at different times A–F. That is, FIG. 6 shows the cache memory 230 subsequent to each original slice-value being processed, as designated by the cache memory 230 shown at times A through F. Additionally, FIG. 6 shows the cache element that contains the current-encoded cache slice-value 236, i.e., the base cache-address, as designated by a "*".

As shown in FIG. 6, the first original slice value 226 to be processed possesses the value of 1011. In compression process step 1, the cache process portion 122 determines that no match is in the cache memory. Since no match is found, the process passes to compression process step 2. This is to be expected since it is the first slice-value to be processed. As a result, the current cache slice-value 236 is directly output to the compressed database memory 240 as shown in FIG. 5. Illustratively, the slice-value 1011 is output to the compressed database cell 243 having the coordinates (1,1).

Accordingly, no compression is performed with respect to this initial original slice-value 226. However, the cache process portion 122 stores the current original slice-value 226 in the cache memory 230 at the 0 cache address, while shifting the cache memory content upwards. As a result, for example, the highest cache address location in the cache memory 230 is loaded with the content of the location immediately proceeding it. This process repeats down to the 1 cache address. That is, the cache element 231 at the 0 cache address will be moved to 1 cache address. Further, the content of the highest cache address located in the cache memory 230 is discarded in the process. Accordingly, the system and method of the invention utilizes a first in-first out technique in accordance with this aspect of the invention. However, it should, of course, be appreciated that in this initial processing such reorganization of the cache memory is merely moving zeros in the cache memory 230.

The current slice-value, i.e., the slice value currently being processed, is thus loaded into the cache memory at the 0 cache address. That is, the current slice-value (1011) is loaded into the cache memory 230 as a cache slice-value 236 at the 0 cache address. The base cache-address containing the current-encoded cache slice-value 236 is reset to the 0 cache address. That is, the cache address that will be first looked to for a match in the next iteration is reset to 0. This is a result of the current cache slice-value 236 being positioned at the 0 cache address, even though there was no match found. This is the cache memory content shown in FIG. 4, as well as in the far left cache memory 230 in FIG. 6, i.e., at time A.

Thereafter, the cache process portion 122 retrieves a further slice-value from the database 222. That is, the cache process portion 122 retrieves another current original slice-value 226 for processing, i.e., the value 1100. Accordingly, to process this value, the cache process portion 122 returns to the step 1 compression process described above.

The value 1100, which is different than the value 1011, will also be the subject of step 2 compression processing. To explain, in the step 1 compression process in accordance with the system and method of the invention, the cache process portion 122 first compares the current original slice-value 226 with the current-encoded cache slice-value 236 in the base cache-address. If not a match, the cache process portion 122 then searches the remainder of the cache memory 230 starting with the lowest address and progressing upward. With the value 1100, the cache process portion 122 will determine that a cache slice-value 236 in the cache memory 230 does not match the current slice-value, which was obtained from the original slice-value memory 220. As a result, the cache process portion 122 will perform a compression process step 2, as described above. This will result in the cache memory 230 content as shown at time B.

Then, the cache process portion 122 will process the slice-value 1011 from the original slice value memory 220. In compression process step 1, the cache process portion 122 will initially look to the current-encoded cache slice-value 236 at the base cache-address, which is 0. No match being found, the cache process portion 122 will then move to a higher address and find a match at cache address 1. The matching address is not 0, and thus, the cache process portion 122 will go to compression process step 4.

In step 4, the cache process portion 122 will output the address of the matching value in the cache memory 230, i.e., cache address 1, to the compressed database cell 243. Then, since the cache address at which the match was located is not 0, the cache process portion 122 will continue to the further steps of compression process step 4. Specifically, the cache process portion 122 will move the value 1011 to the 0 cache address. Further, the cache process portion 122 will move up all items in the cache memory that were below the matching address, i.e., in this case, the value 1100. However, note that the cache address 1 will now be the base cache-address and contain the current-encoded cache slice-value 236. Thereafter, the values 1011, 1100 and 1100 in the original slice-value memory 220 will be processed in turn by the cache process portion 122.

It should be appreciated that the compression process as described above is reversible. The decompression process in accordance with the system and method of the invention is similar to the compression process. That is, the compressed database memory 240 contains both slice-values and cache encoded-values. The slice-values may be simply output to a reconstructed image. Further, the encoded-values in the compressed database memory 240 are used to read the cache memory content, which allows mapping to an original slice-value.

It should be recognized that identical cache memories should be used to both compress and decompress an image. Further, these identical cache memories should be initialized in the same manner. Thus, one cache memory might be compressing an image, while another is decompressing a previously compressed image. However, it should be appreciated that while a cache memory must be initialized similarly before compressing and decompressing an image, no information regarding the content of the memory store in the compression process is needed in the decompression process.

The decompression process in accordance with the system and method of the invention will hereinafter be described. To start the decompression process, the cache process portion 122 starts with decompression process step 1. In decompression process step 1, the cache process portion 122 reads an item from the compressed database. Each item must be processed in the decompression process in the same order that the items were processed in the compression process. If the item is an unencoded slice value, then the cache process portion 122 proceeds to decompression process step 2.

Otherwise if the item is a cache encoded-value, the cache process portion 122 uses it to read the original image one-dimensional slice value from the cache memory. After the original image slice value is recovered from the cache memory, the cache process portion 122 determines if the matching cache address was 0. If yes, then, if the memory content at address K in the cache memory, does not match the slice value at cache address 0, the cache process portion 122 goes to step 2. Otherwise, if the matching slice-value was at the zero address and the memory content at address K in the cache memory, does match the slice value at cache address 0, the cache process portion 122 goes to decompression process step 3. Further, if the matching slice-value is not at the zero cache address, then the cache process portion 122 goes to step 3.

In further explanation, in the compression process as described above, the cache process portion 122 processes all the slices in a source image to compress the image. The end result of this compression process is a compressed database memory 240. The compressed database memory 240 represents the data of the image 12 in compressed form.

In contrast, in the decompression process, the cache process portion 122 reads each item from the compressed database memory 240. The initial step or steps performed by the cache process portion 122 in the decompression process may be characterized as the "step 1 decompression process" described above. For example, the cache process portion 122 reads the item in the compressed database cell 243 (1,1) as shown in FIG. 5. This item is a compressed database slice-value 246, and is not encoded. Upon reading the compressed database slice-value 246, the cache process portion 122 proceeds to step 2 decompression process, as described below. Then, the cache process portion 122 proceeds to the next item in the compressed database memory 240.

In turn, the cache process portion 122 continues to read and process all the items in the compressed database memory 240. This reading may be performed in any suitable manner. Illustratively, the cache process portion 122 may read each row of data, left to right, starting from the top and proceeding downward, as shown in FIG. 5. However, as described above, it is necessary, that the compressed database memory 240 be read to decompress the image in the same order, or effectively in the same order, that the original slice value memory 220 was read when compressing.

Figure 9:
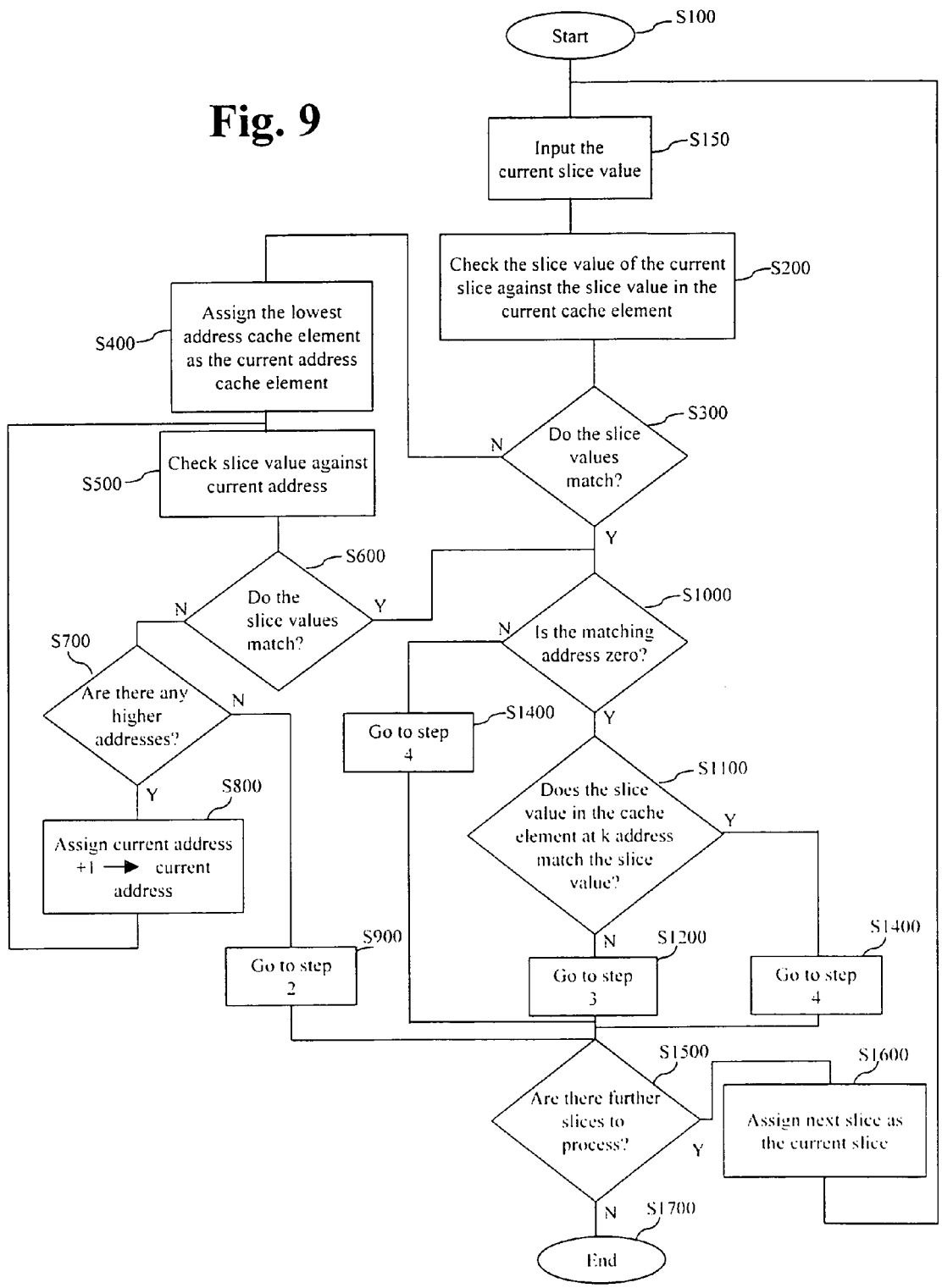
FIG. 9 is a flowchart showing the step 1 image compression process in accordance with the system and method of the invention.

As should be apparent, the cache process portion 122 will read each of the compressed database encoded-values 247, as well as compressed database slice-values 246, as described above. For example, the cache process portion 122 will read the compressed database encoded-value 247 in the compressed database cell 243 (3,1) as shown in FIG. 9. This item in the compressed database memory 240 is an encoded item. As a result, the cache process portion 122 must process the compressed database encoded-value 247 to generate an appropriate corresponding slice-value. Specifically, the cache process portion 122 utilizes the cache memory 230 to determine the appropriate corresponding slice-value.

In further explanation of the system and method of the invention, decompression process step 1 will hereinafter be described in further detail. In accordance with the invention, various different scenarios may be present when processing the values from the compressed database memory 240 using the cache memory 230. These scenarios, for example, depend on the content of the cache data cells 233 at the cache address K in the cache memory 230.

In a first scenario, the item from the compressed database memory 240 is an encoded-value having a value 0. Thus, the corresponding slice-value is found at the 0 cache address in the cache memory 230. In this first scenario, the contents of cache address K in the cache memory 230 do not match the slice-value at the 0 address. In this scenario, the cache process portion 122 proceeds to step 2 decompression process, as described below.

In a second scenario, the cache encoded-value is 0. Accordingly, this value is mapped to the slice-value in the 0 cache address in the cache memory 230. However, the contents of cache address K in the cache memory 230 do match the slice-value in the 0 cache address of the cache memory 230. In this scenario, the cache process portion 122 proceeds to decompression process step 3, as described below.

Further, in a third scenario, the cache encoded-value is not 0. Thus the cache encoded-value will be mapped to some other location in the cache memory. In this scenario, the cache process portion 122 also proceeds to decompression process step 3 as described below.

In respect to these three scenarios, it should be appreciated that the decision making process utilized by the cache process portion 122 in the decompression process is similar to the decision making process utilized by the cache process portion 122 in the compression process. Accordingly, in accordance with this embodiment of the system and method of the invention the K cache address used in the decompression process must have the same value as the K value used in the compression process.

In the step 2 decompression process, the cache process portion 122 reassembles each slice, i.e., the two-dimensional rectangle or h*w array, based on either an unencoded slice-value or, alternatively, an encoded-value using the cache memory 230. In other words, the cache process portion 122 outputs a reconstructed image slice. The reconstructed image slice may correspond exactly to the corresponding original image slice if a lossy process was not used. Alternatively, the reconstructed image slice may correspond approximately to the corresponding original image slice if a lossy process was used.

As described above, the step 2 decompression process is implemented when an encoded-value is read from the compressed database memory 240, as well as when an unencoded slice-value is read from the compressed database memory 240. In both scenarios, the read slice-value or the mapped to slice-value is stored in the cache memory 230. Specifically, the slice-value is stored in a cache element 231 at the 0 cache address in the cache memory 230. Further, the memory content of the cache memory 230 is shifted upwards. Thus, the highest cache address in the cache memory 230 is discarded. Once an item is processed, then, the cache process portion 122 inputs another item for processing.

As described above, padding lines may be used to decrease the complexity of processing and, as a result, enhance the speed of processing. Accordingly, if the last band in the image is being processed, then the padding lines should be discarded.

As discussed above, the step 2 process is utilized in the scenario when the cache encoded-value is at the 0 cache address in the cache memory 230, but the contents of cache address K in the cache memory 230 do match the slice-value at the 0 address in the cache. In this scenario, the step 2 process creates a respective duplicate slice-value in both the 0 cache address and the 1 cache address in the cache memory 230. The creation of these duplicate cache elements 231 mirrors the compression process and enhances the compression efficiency. Specifically, the duplicate cache elements 231 enhance the processing of repeating sequences in an image.

In the step 3 decompression process, the cache process portion 122 reassembles each slice, i.e., the two-dimensional rectangle or h*w array, based on an encoded-value using the cache memory 230. In other words, the cache process portion 122 outputs a reconstructed image slice. The reconstructed image slice may correspond exactly to the corresponding original image slice if a lossy process was not used. Alternatively, the reconstructed image slice may correspond approximately to the corresponding original image slice if a lossy process was used.

In the decompression process step 3, in accordance with one scenario, the matching encoded cache slice-value is positioned at the 0 cache address in the cache memory 230 and the slice-value at the K cache address matches the slice-value at the 0 address. As a result, in such a scenario the cache memory 230 has already been organized to enhance the processing of a repeating sequence of slices. In such a scenario, the cache process portion 122 concludes step 3 subsequent to outputting the reconstructed image slice. Thereafter, the cache process portion 122 retrieves another item from the compressed database memory 240 for processing.

Alternatively, in accordance with an embodiment of the system and method of the invention, in decompression process step 3 the encoded-value is not 0, but rather some other encoded value. When this scenario occurs, the current slice has a high probability to be the first of a sequence. As a result, the cache process portion 122 creates an assumed slice sequence in the cache memory 230. To explain, the cache process portion 122 achieves this by shifting up the contents of the cache memory 230. The shift is however limited to the cache addresses below the matching cache address in the cache memory 230.

Further, if the matching encoded-value is not positioned at the 0 cache address, the cache element 231 containing the matching encoded-value is moved to the 0 cache address. Accordingly, while locations are changed in this scenario, no new slice-values are stored into the cache memory and no cache address in the cache memory 230 is discarded. Accordingly, in this scenario, the cache process portion 122 concludes step 3 subsequent to outputting the reconstructed image slice and changing the locations of cache elements 231 in the cache memory 230.

Once all the items in the compressed database memory 240 have been processed by the image compression system 100 using the decompression processes described above, the image is fully reconstructed to result in a generated image. This generated image may be output from the image compression system 100 using the interface portion 110 and the output port 114. Alternatively, the generated image may be stored in the output image data memory 250 for use at some subsequent time.

It should be appreciated that it is not necessary to process the entire image using the system and method of the invention. Rather, a portion or select areas of the image may be processed using the method of the invention.

The system and method of the invention produces what might be characterized as partial compressed images. That is, it should be appreciated that, as necessary, the output generated by the process of the invention may be further encoded using a Huffman technique, a run length technique, or any other suitable compression technique. In fact, the system and method of the invention provides a compressed output that readily lends itself to further run length encoding due to the constant output generated by the method of the invention.

Accordingly, the compression/decompression process of the system and method of the invention utilizes a memory management that achieves automatic detection of repeating sequences of slices. The process provides a positive impact on compression speed and ratio.

Illustratively, assume a repeating sequence of n slices, as described above. While the first sequence of n slices is processed, no match is found in the cache memory. Accordingly, the slices are stored from location n−1 down to location 0. Thereafter, when the first slice of the second sequence is processed, a match is found at location n−1. As a result of the manner in which the cache memory is managed, the subsequent slices also match location n−1 as long as the sequence repeats in the image. Further, as the current encoded-value does not change, the match is found without a search. This results in the compression speed increasing. Furthermore, it should be recognized that the encoded output is a repeating string of n−1 values, which is very well suited for further run-length encoding, for example, as well as other conventional compression techniques.

The degree of sequence detection depends on the size of the cache memory, as should be apparent from the above description. Also, the cache memory search is only required during the compression phase of the method of the invention. As a result, the decompression process of the invention may run faster than the compression process. This aspect of the invention is important in environments such as printing or copying, for example. Further, the method of the invention does not impose necessary values for the cache memory or the size of the slices.

Figure 7:
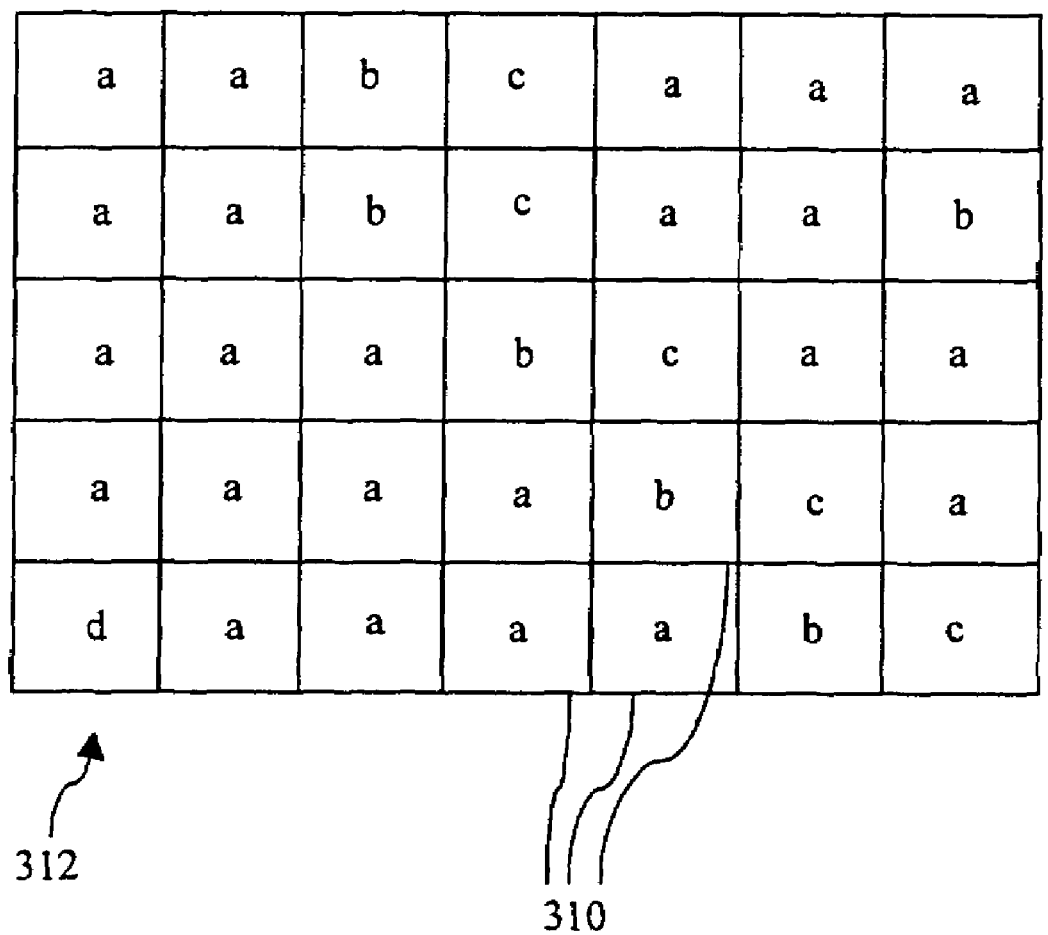
FIG. 7 is diagram showing an image containing slice-values in accordance with the system and method of the invention.
Figure 8:
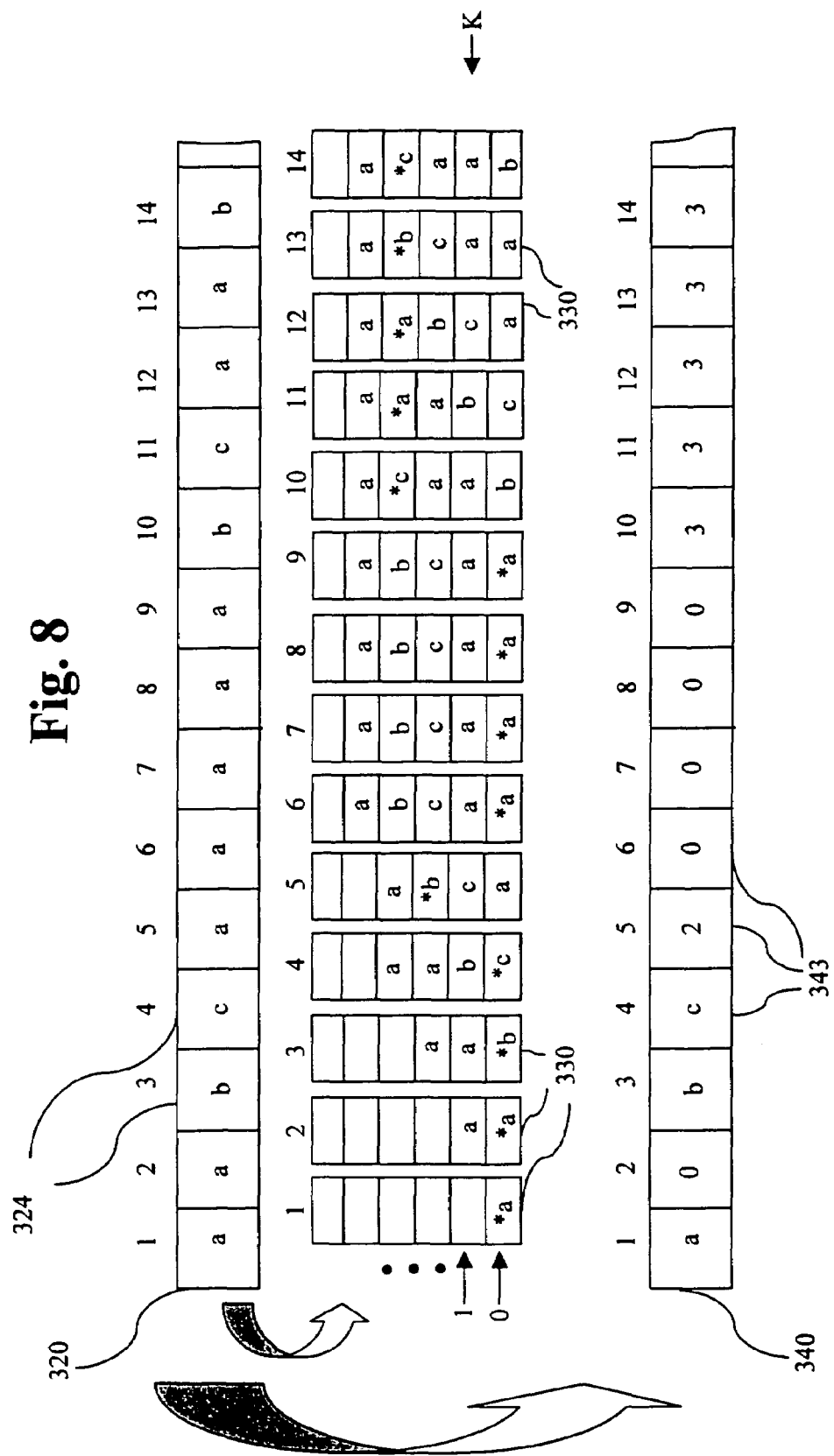
FIG. 8 is a diagram showing an original slice-value memory, a cache memory and a compressed image database memory in accordance with the system and method of the invention.

FIGS. 7 and 8 in conjunction with the description below illustrate a further example of the system and method of the invention. In particular, FIG. 7 shows an image 312. As shown in FIG. 7, the image 312 is divided into slices 310 in accordance with the system and method of the invention. As shown in FIG. 7, a, b, c and d are used to represent slice-values. Accordingly, in the first row of the image 312, the slices are arranged in the sequence a, a, b, c, a, a and a.

FIG. 8 is a diagram illustrating processing of the image 312 in accordance with the system and method of the invention. Specifically, FIG. 8 shows an original slice-value memory 320 that includes a plurality of original slice-value cells 324. The original slice-value memory 320 is shown containing the first two rows of the slice-values shown in FIG. 7. Additionally, FIG. 8 shows the cache memory 330 at different times as items in the original slice-value memory 320 are processed, in accordance with the invention.

As shown in FIG. 8, the cache memory contains different slice-values at different times. Also, the "base cache address," as described above, in each of the respective cache memories 1 through 14 is designated by a "*" symbol. Additionally, FIG. 8 shows a compressed image database 340, which includes a plurality of compressed item cells 343. As shown in FIG. 8, the compressed item cells include either a slice-value or an encoded-value. Each original slice-value cell 324, each cache memory 330 and each compressed item cell 343 are numbered 1 to 14, respectively, for purposes of explanation.

In accordance with the system and method of the invention, the compression process is initiated by clearing the cache memory. Then, the process continues by reading the first slice-value "a" in the first original slice-value cell 324, i.e., in the "original slice-value cell 1" as shown in FIG. 8. In accordance with the compression process step 1, the slice-value a is checked against the cache memory content for a match. However, the slice-value is not found in the cache memory since the cache memory has previously been initialized to be empty. Alternatively, it should be noted that while not shown in FIG. 8, the cache memory may be initialized to contain all zeros.

Accordingly, no match is found in the cache memory. As a result, the process passes to decompression process step 2. In step 2, the slice-value is output to the compressed item cell 1. Additionally, the slice-value a is stored at the 0 address in the cache memory. The "base cache address," i.e., the cache address which will be compared to first in processing the next slice-value, is set to 0 and is designated by a "*." Thus, the current-encoded cache slice-value is "a" and is stored at the base cache-address 0. Such a content of the cache memory is shown in FIG. 8 by the "cache memory 1." Then, the method of the invention is ready to process the next slice-value.

The next slice-value a is retrieved from the original slice-value cell 2 for processing. The method first checks the slice-value against the cache memory content for a match. In particular, the method starts this comparison process by checking with the base cache-address containing the "current-encoded cache slice-value." Since the current-encoded cache slice-value is "a" at the base cache-address 0, the method first looks at the 0 address in the cache memory. A match is found. Then, the method checks whether the matching address is 0, which it is. Then, in accordance with decompression process step 1, the method determines whether the memory content at address K matches the slice-value in the 0 address. As shown in FIG. 8, the address K was selected to be the 1 cache address. The content at the 1 cache address does not match in the present case. Accordingly, the method proceeds to step 3 of the compression process. In step 3, the method outputs the encoded-value, i.e., the address of the match, to the compressed item cell 2 in the compressed database 340. Since the match was found at address 0, the encoded-value 0 is output. Additionally, the method stores the slice-value a in the cache memory at location 0, while shifting the memory content upwards as shown in cache memory 2, as shown in FIG. 8. Accordingly, a duplicate entry is effectively loaded at the address 0 in the cache memory. The base cache-address remains at the 0 cache address. Then, the method is ready to process another slice-value.

Accordingly, the method retrieves the slice-value b from the original slice-value cell 3. The method initially checks the base cache-address. In the present case, no match is found at the base cache-address. As a result, the method continues to look from the lowest address up in the cache memory. However, no match is found. Accordingly, the method proceeds to step 2.

It should be recognized that by looking first at the base cache-address and then the lowest address up, a redundancy is potentially present in the compression processing of the invention. That is, the base cache-address may, as a result, be compared to twice in the processing of a slice-value. However, this redundancy is acceptable while still attaining efficient processing in accordance with the system and method of the invention.

According to decompression process step 2 in processing slice-value from the original slice-value 3, the slice-value is output to compressed item cell 3 as an unencoded slice-value. Additionally, the slice-value b is stored in the cache memory at location 0, while shifting the memory content upward as shown in cache memory 3 in FIG. 8. In accordance with step 2, the base cache-address remains 0.

Next, the method retrieves slice-value c from the original slice cell 4 for processing. The slice-value c is processed in the same manner as slice-value B described above. Accordingly, the processing of slice-value c results in the cache memory 4 and the compressed item cell 4, which contains the unencoded slice-value c.

Next, the method retrieves the slice-value a in original slice-value cell 5 for processing. In accordance with step 1 of the compression process, the method checks the slice-value against the cache memory content, starting with the address defined by the base cache-address, which contains the current-encoded cache slice-value. The current-encoded cache slice-value is currently at the base cache-address 0, which contains the slice-value c. This is not a match to the slice-value a. Accordingly, the method continues looking from the lowest address up. As shown in the cache memory 4, previously generated as described above, a match is found at cache address 2. Accordingly, since the matching address is not 0, the method proceeds to step 4. In step 4, the address of the cache memory is output to the compressed item cell 5. This is the encoded-value of the slice, i.e., the value 2. Additionally, the base cache-address is set to 2, as indicated by the *, in accordance with step 4 of the compression process. In accordance with step 4, the cache memory is shifted upward. However, the shift is limited to the addresses below the matching address, with the slice-value at the matching address being moved to the 0 cache address. This cache memory content is shown in cache memory 5, as shown in FIG. 8.

Thereafter, the compression method in accordance with the invention continues utilizing compression steps 1–4 as is necessary. As is evident from the compressed image database 340, the method of the invention results in a sequence of four "0's" and five "3's." As should be apparent, such output is very suitable for further compression techniques including, for example, run-length encoding.

Accordingly, original slice-value cells 6–14, and the slice-value contained therein, will be processed in turn. In further explanation of the process, the slice cell b in original slice-value cell 10 will be processed. The slice-value b in original slice-value cell 10 will be processed using cache memory 9 as shown in FIG. 8. In accordance with step 1, the method will initially look at the base cache-address. As shown in cache memory 9, the base cache-address is the cache address 0. The 0 address in cache memory 9 contains a slice-value a, which is not a match. After starting with the address defined by the base cache-address, the method then continues looking from the lowest address up. A match is eventually found at cache address 3 in cache memory 9. Since the matching address is not 0, the process proceeds to step 4. In accordance with step 4, the address of the cache memory that contains the match is output to the compressed image database. Specifically, the value 3 is output. In accordance with step 4, the content of the address of the match is moved to the 0 address. Additionally, the content of the addresses below the match are shifted upward. As a result, the content of the cache memory results in cache memory 10, as shown in FIG. 8. Additionally, the base cache-address is set to 3, since that is where the match was found. Accordingly, the processing of slice-value b in original slice cell 10 is complete.

Thereafter the processing of original slice cells 11–14 as shown in FIG. 8, as well as the additional slices shown in FIG. 7, will be processed in turn until the entire image is compressed. The compressed image may then be subjected to other image compression processes such as run-length compression processes, for example.

In accordance with the system and method of the invention, the compressed image shown in the compressed image database 340 in FIG. 8 may be decompressed, as described herein. Before the decompression process is initiated, the cache memory to be used must be initialized to contain all zeros, for example. Further, as described above, the decompression process must in a sense "mimic" the compression process. Illustratively, in the decompression process the method will read the slice-value "a" from the compressed item cell 1. The item is an unencoded slice-value. As a result, the method will pass to decompression process step 2. In step 2, the method reassembles the two-dimensional array of the original image from the one-dimensional slice-value. Additionally, the method outputs the reconstructed image slice. The slice-value is stored at cache address 0. The processing of compressed item cell 1 is then complete.

Next, the method processes the compressed item cell 2 containing the encoded-value 0. In accordance with step 1 of the decompression process, the method reads the item from the compressed input. The item is an encoded-value. As a result, the method uses the encoded-value to read the slice-value from the cache memory. Specifically, the method looks to the cache memory at the 0 address. The slice-value a is at the 0 address. Accordingly, the method reads the original image slice-value a from the cache memory. After the original image slice-value is recovered from the cache memory, the method determines whether the matching value was at the 0 address in the cache memory. Since it is, then the method determines if the memory content at address K matches the slice-value. Since it does not, then the decompression process passes to step 2. In step 2, the two-dimensional array of the original image is reassembled from the one-dimensional slice-value. The reconstructed image slice is output to the reconstructed image. Additionally, in accordance with step 2 of the decompression process, the slice-value is stored in the cache memory at location 0, while shifting the content upward. The processing of the compressed item cell 2 is complete.

Then, the method processes the compressed item cell 3 containing slice-value B. This processing as well as the decompression processing of compressed item cells 4–14 are performed in accordance with decompression steps 1–4 as described in detail above. As a result, a reconstructed image is created. If a lossy process was not used, the reconstructed image will correspond exactly to the original image.

FIG. 9 is a flowchart showing the compression process in accordance with an embodiment of the method of the invention. As shown in FIG. 9, the process starts in step 100. Then the process passes to step S150. In step S150, a current slice-value is input from an image. Then the process passes to step S200. In step S200, the slice-value of the current slice is checked, i.e., compared for a match, against the slice-value in the current cache element, i.e., in the base cache-address.

Then, in step S300, a determination is made whether the slice-values match. If the slice-values do not match, then the process passes to step S400.

In step S400, the lowest cache address cache element is assigned as the current cache address cache element. Then the process passes to step S500. In step S500, the slice-value is checked against the current cache address. Then in step S600, a determination is made whether the slice-values match. If no, the process passes to step S700. Alternatively, if yes, the process passes to step S1000.

In step S700, a determination is made whether there are any higher cache addresses in the cache memory. If there are not any higher cache addresses, the process passes to step S900. In step S900, the process passes to step 2 of the invention. Alternatively, if there are higher cache addresses in step S700, then the process passes to step S800. In step S800, the current cache address+1 is assigned as the current cache address. Then, the process returns to step S500.

As described above, a determination is made in step S300 whether the slice-values match. If the slice-values do match in step S300, then the process passes to step S1000.

In step S1000, a determination is made whether matching cache address is a 0 cache address. If no, then the process passes to step S1400 as shown in FIG. 9. In step S1400, the process passes to step 4 of the invention. Alternatively, if yes in step S1000, i.e., the matching cache address is a 0 cache address, then the process passes to step S1100.

In step S1100, a determination is made whether the slice-value in the cache element at K cache address matches the slice-value. If no, then the process passes to step S1200 as shown in FIG. 9. In step S1200, the process passes to step 3 of the invention.

Alternatively, in step S1100 if the slice-value in the cache element at K cache address does match the slice-value, then the process passes to step S1400. In step S1400, the process passes to step 4 of the invention.

As shown in the flowchart of FIG. 9, the process passes to step S1500 subsequent to each of step S900, step S1200, or step S1400. In step S1500, a determination is made whether there are any further slices to process. If yes, then the process passes to step S1600. In step S1600, the next slice is assigned as the current slice. The process then returns to step S150 in which another current slice-value is input for processing.

Alternatively, if in step S1500 there are no further slices to process, the process then passes to step S1700. In step S1700, the process ends.

Figure 10:
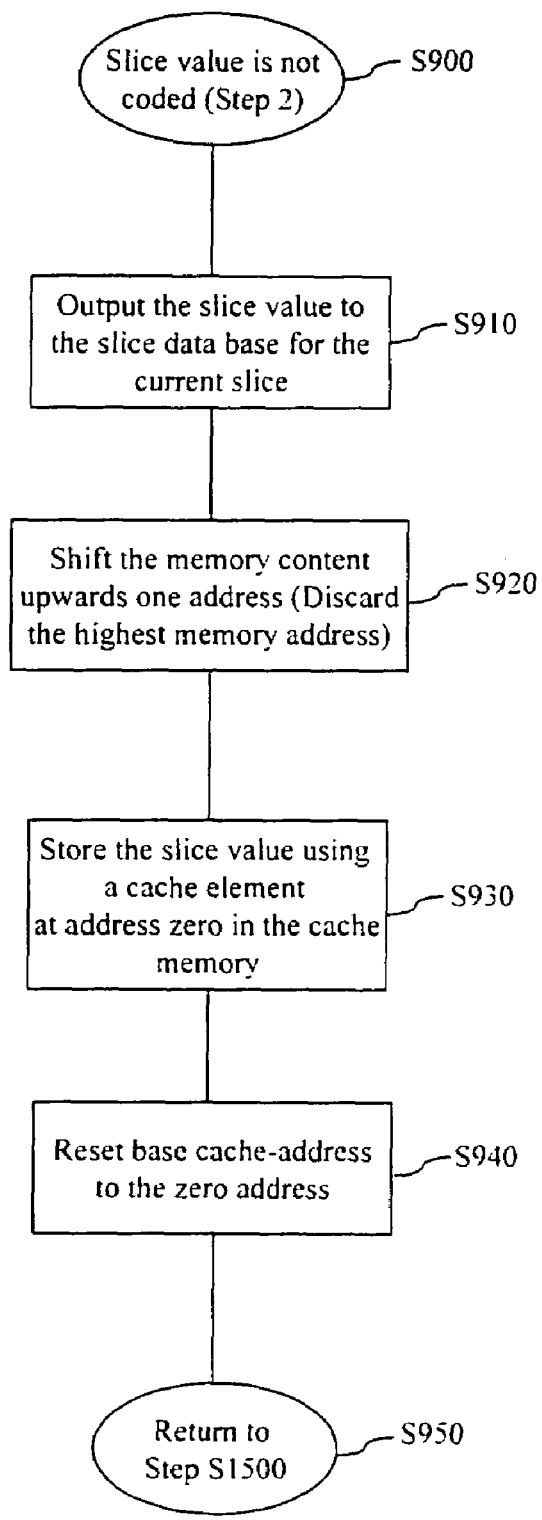
FIG. 10 is a flowchart showing the step 2 compression process of FIG. 9 in accordance with the system and method of the invention.

FIG. 10 is a flowchart showing in further detail the step 2 process of FIG. 9. As shown in FIG. 10, the process starts in step S900. Then, the process passes to step S910.

In step S910, the slice-value for the current slice is output to the slice database. Then the process passes to step S920. In step S920, the memory content of the cache memory is shifted upwards one cache address, which results in the highest memory cache address in the cache memory is discarded. Then, in step S930, the slice-value is stored in the cache memory using a cache element at location 0 in the cache memory. Then the process passes to step S940.

In step S940, the base cache-address is reset to be at the 0 cache address in the cache memory. Then the process passes to step S950. In step S950, the process returns to step S1500 in FIG. 9.

Figure 11:
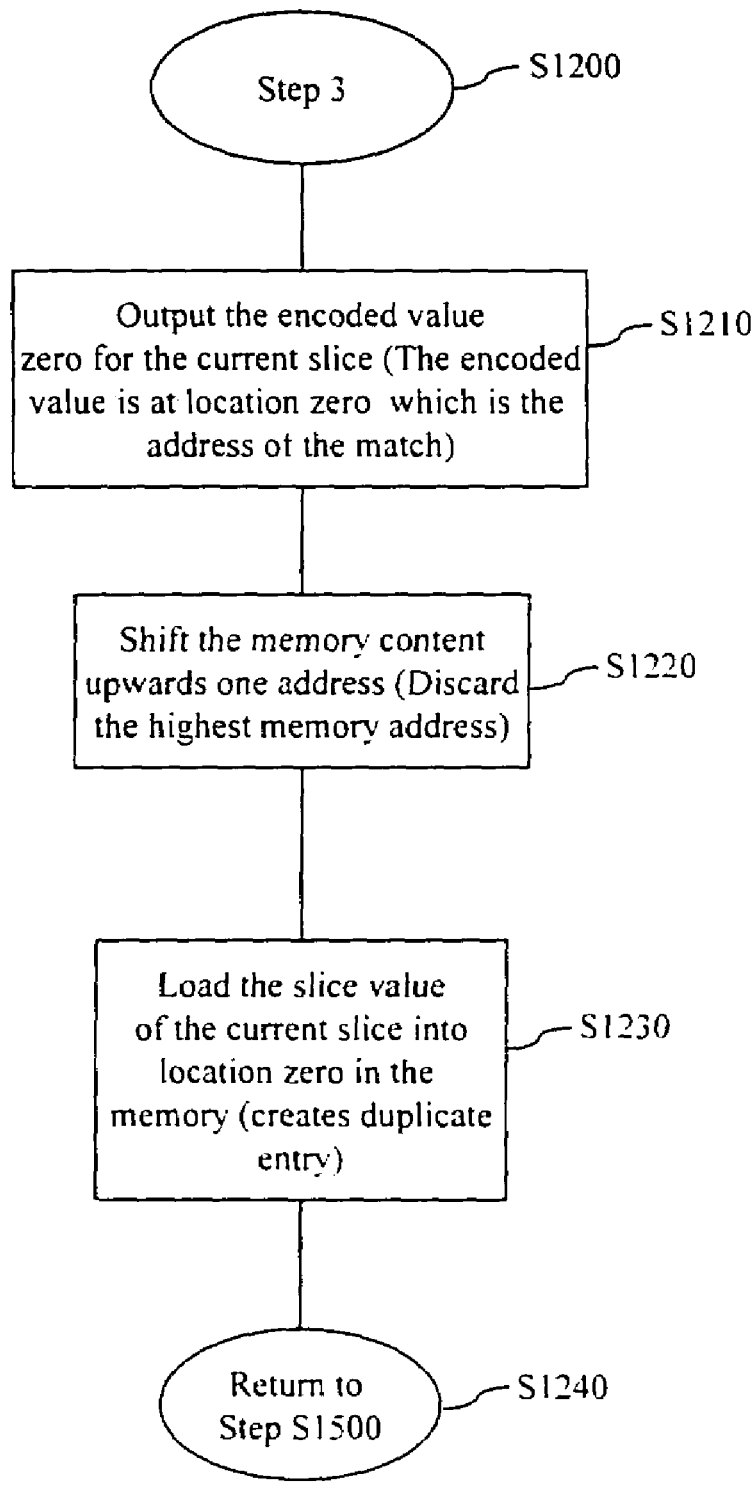
FIG. 11 is a flowchart showing the step 3 compression process of FIG. 9 in accordance with the system and method of the invention.

FIG. 11 shows in further detail the step 3 compression process of FIG. 9. As shown in FIG. 11, the process starts in step S1200. After step S1200, the process passes to step S1210. In step S1210, the encoded-value 0 is output for the current slice. That is, in step S1210, the encoded-value is 0, which is the cache address of the match. After step S1210, the process passes to step S1220.

In step S1220, the memory content in the cache memory is shifted upwards one cache address, i.e., the highest cache address in the cache memory is discarded. Then the process passes to step S1230.

In step S1230, the slice-value of the current slice is loaded into the 0 cache address in the cache memory, i.e., a duplicate entry is created. Also, the base cache-address is reset to 0. Then the process passes to step S1240. In step S1240, the process returns to step S1500 as shown in FIG. 9.

Figure 12:
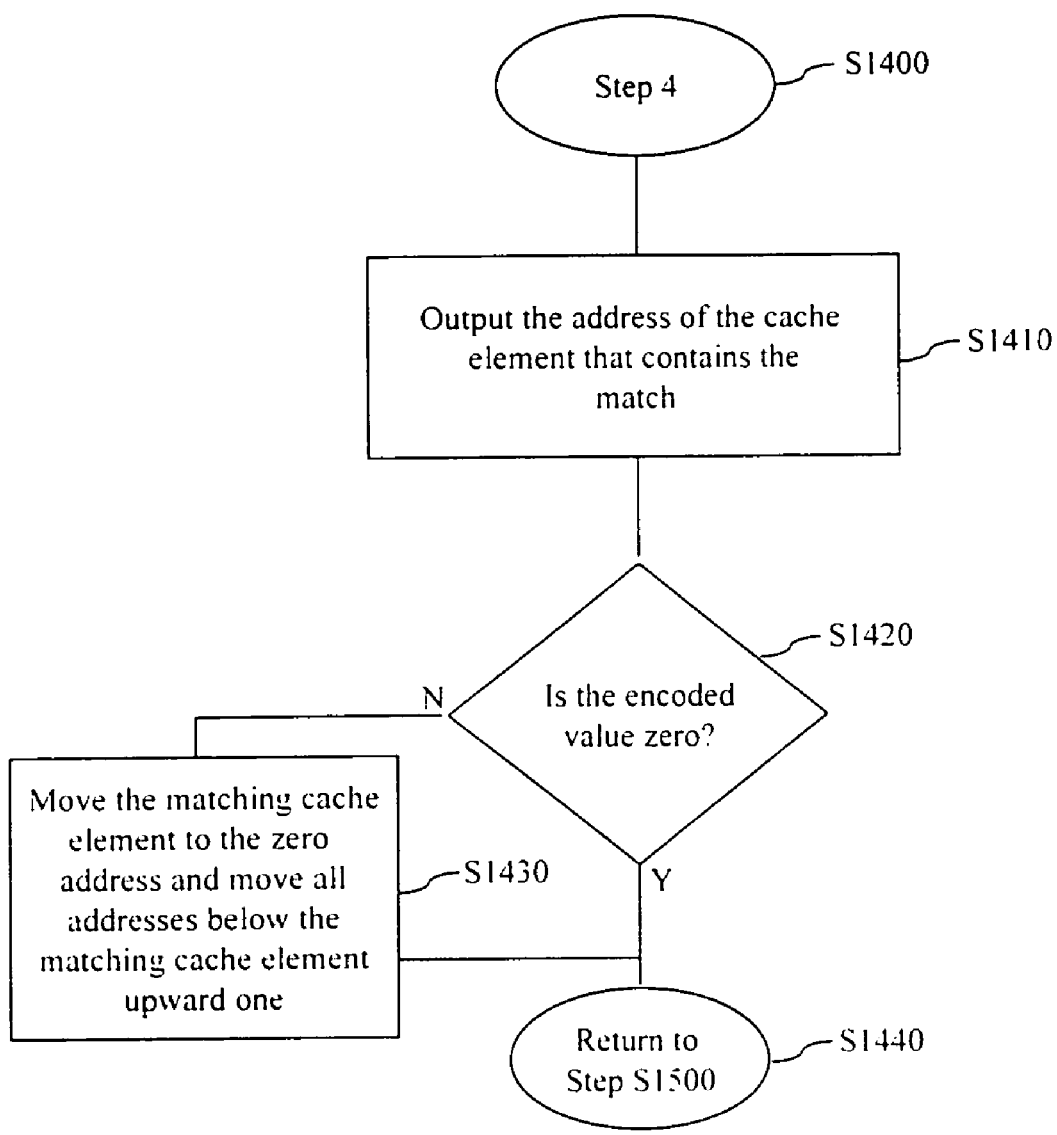
FIG. 12 is a flowchart showing the step 4 compression process of FIG. 9 in accordance with the system and method of the invention.

FIG. 12 is a flowchart showing in further detail step 4 of FIG. 9. As shown in FIG. 12, the process starts in step S1400. Then the process passes to step S1410.

In step S1410, the cache address of the cache element that contains the match is output to the slice database. Also, the base cache-address is set to the cache address that contained the match. Then the process passes to step S1420. In step S1420, a determination is made whether the encoded-value is positioned at the 0 cache address in the cache memory. If yes, then the process passes to step S1440.

Alternatively, if in step S1420 the encoded-value is not positioned at the 0 cache address, then the process passes to step S1430. In step S1430, the matching cache element is moved to the 0 cache address and all cache addresses which were previously below the matching cache element are moved upwards in the cache memory.

After step S1430, the process passes to step S1440. In step S1440, the process returns to step S1500 in FIG. 9.

Figure 13:
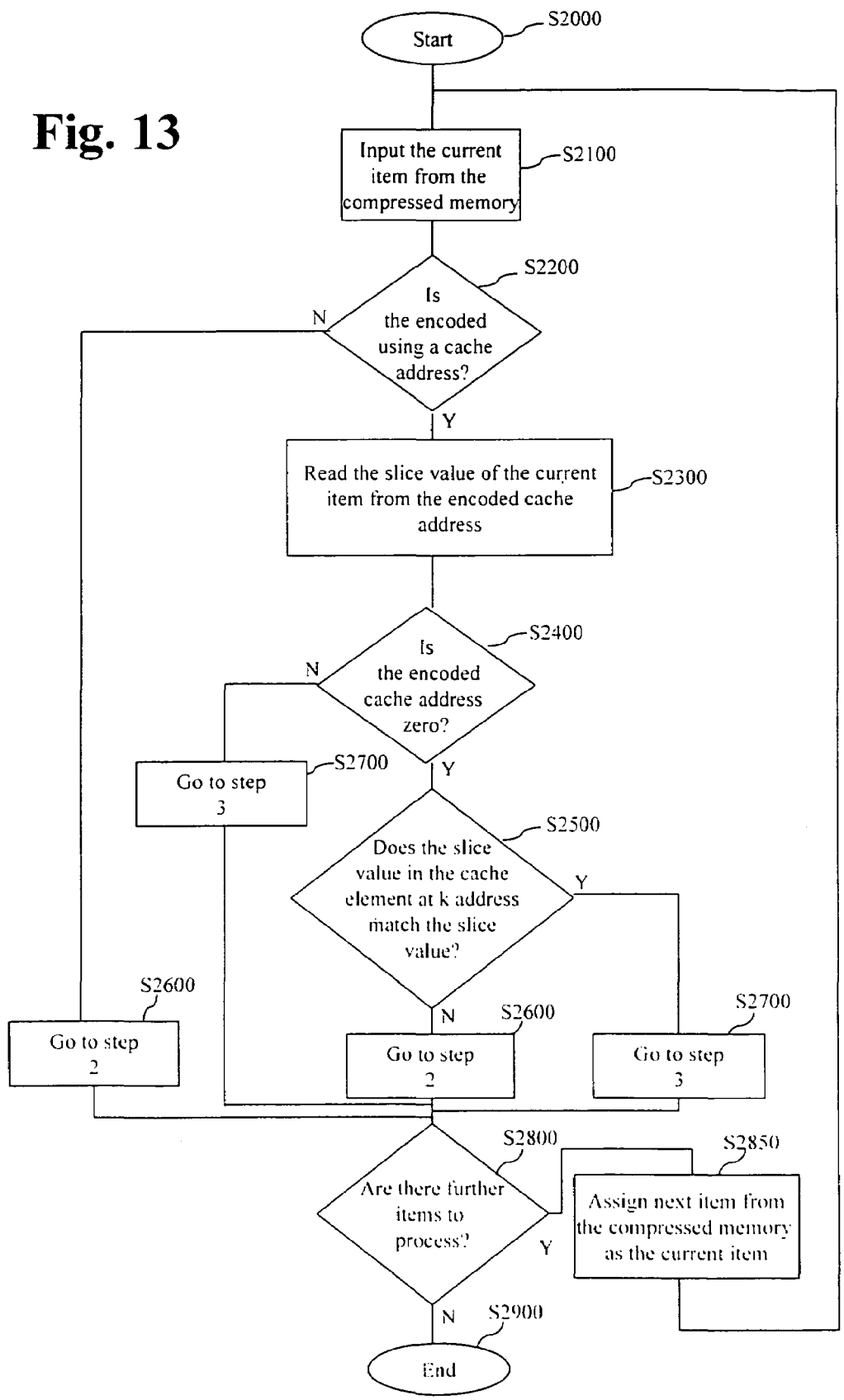
FIG. 13 is a flowchart showing the step 1 image decompression process in accordance with the system and method of the invention.
Figure 14:
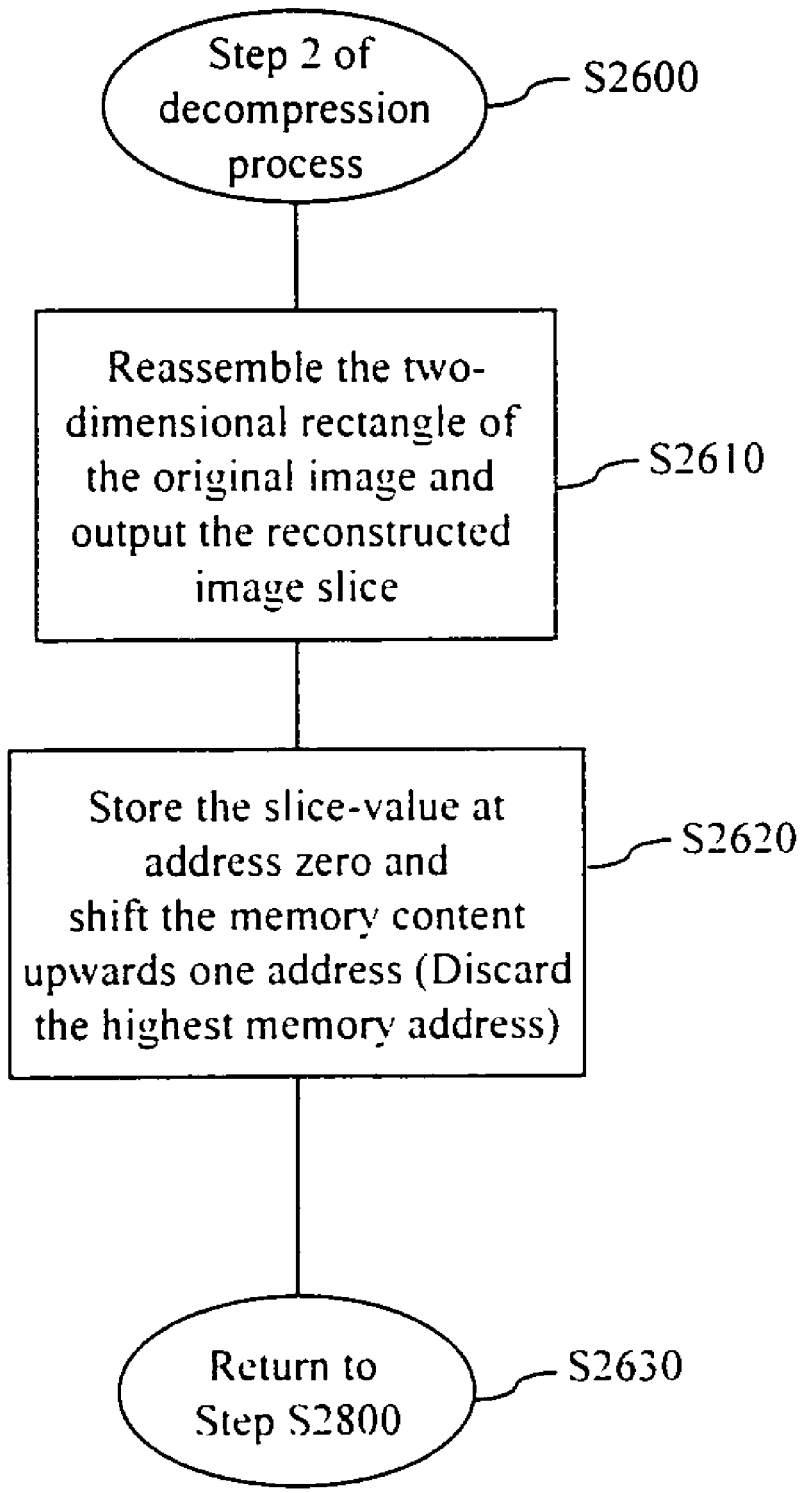
FIG. 14 is a flowchart showing the step 2 decompression process of FIG. 13 in accordance with the system and method of the invention.
Figure 15:
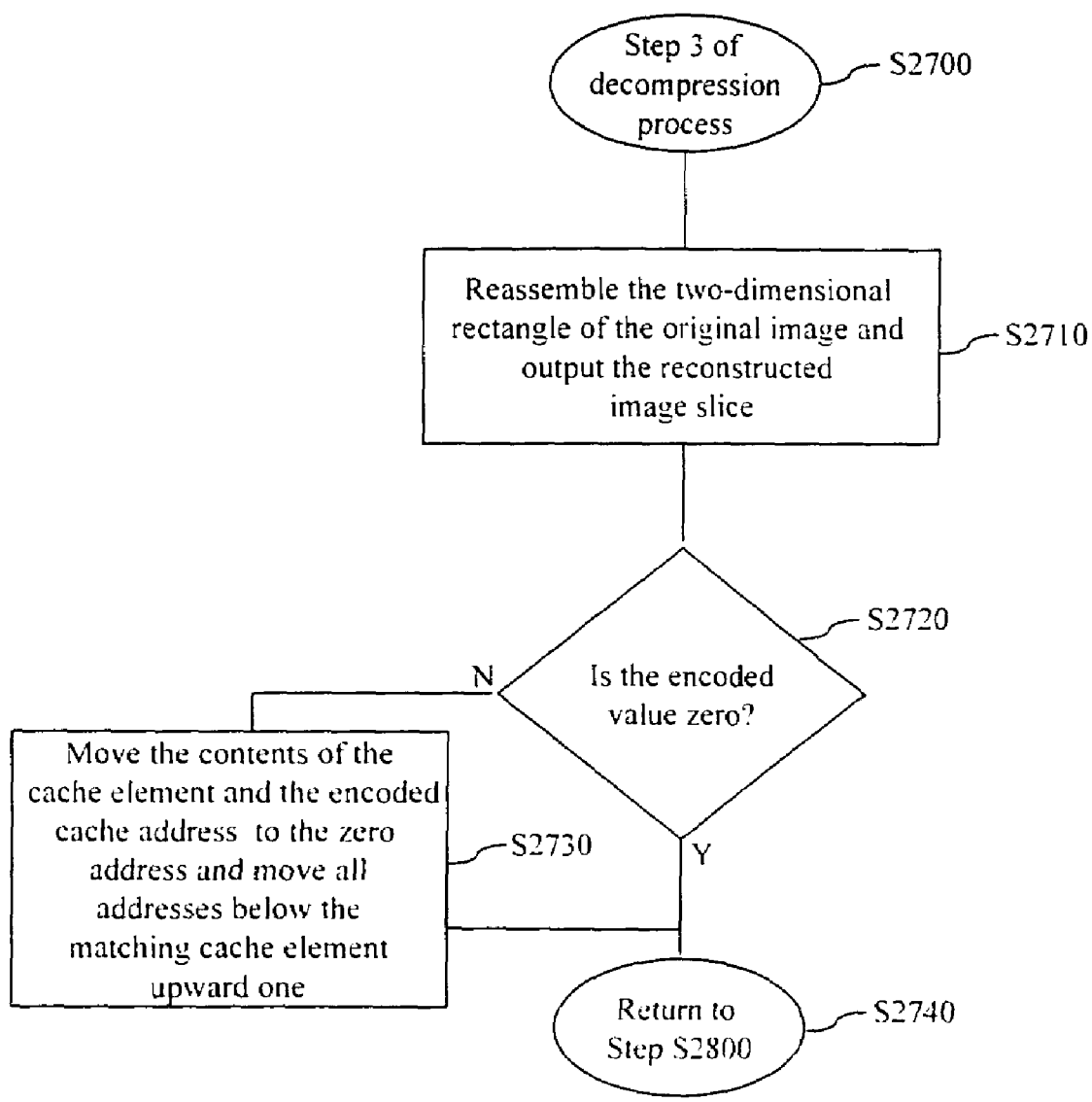
FIG. 15 is a flowchart showing the step 3 decompression process of FIG. 13 in accordance with the system and method of the invention.

FIGS. 13–15 show the decompression process in accordance with an embodiment of the method of the invention. As shown in FIG. 13, the process starts in S2000. Then the process passes to S2100. In S2100, a current item from the compressed memory, i.e., an encoded-value or a slice-value, is input for processing. Then, in S2200, a determination is made whether the input item is encoded using a cache address. If no, then the process passes to S2600. In S2600, the process passes to decompression process step 2.

Alternatively, if yes in S2200, i.e. the item was encoded, then the process passes to S2300. In S2300, the slice-value of the current item is read from the cache address designated by the encoded-value. Then, the process passes to S2400. In S2400, the process determines whether the encoded cache address is 0. If no, then the process passes to S2700. In S2700, the process passes to decompression process step 3.

Alternatively, if yes in S2400, i.e., the encoded cache address is 0, then the process passes to S2500. In S2500, the process determines whether the slice-value in the cache element at the K address matches the slice-value at the zero address in the cache memory. If yes, then the process passes to S2700. In S2700, the process passes to decompression process step 3.

Alternatively, if in S2500 the process determines that the slice-value in the cache element at K address does not match the slice-value, then the process passes to S2600. In S2600, the process passes to step 2 of the decompression process.

Subsequent to either S2600 or S2700, the process passes to S2800. In S2800, the process determines whether there are further items from the compressed image memory to be processed. If yes, the process passes to S2850. In S2850, the next item from the compressed image memory is assigned as the current item. Then the process returns to S2100.

Alternatively, if no in S2800, i.e., there are no further items to process, then the process passes to S2900. In S2900, the process ends.

FIG. 14 shows in further detail the decompression process step 2 of FIG. 13. As shown in FIG. 14, the decompression process starts in S2600. Then, the process passes to S2610. In S2610, the two-dimensional rectangle, for example, of the original image is reassembled and the reconstructed image slice is output. Then, in S2620, the slice-value is stored at the address 0 in the cache memory and the memory content is shifted upward one address. As a result, the highest memory address is discarded.

Then, the process pass to S2630. In S2630, the process returns to S2800 in FIG. 13.

FIG. 15 illustrates in further detail the step 3 of decompression process S2700 of FIG. 13. As shown in FIG. 15, the process starts as S2700. Then, the process passes to S2710.

In S2710, the two-dimensional rectangle, for example, of the original image is reassembled and the reconstructed image slice is output. Then, the process passes to S2720. In S2720, the process determines whether the encoded-value is 0. If no, then the process passes to S2730. In S2730, the contents of the cache element at the encoded cache address is moved to the 0 address, and additionally, all addresses below the matching cache address are moved upward one. After S2730, the process passes to S2740.

Alternatively, if in S2720 the encoded-value is not 0, then the process passes directly to S2740. In S2740, the process returns to S2800 in FIG. 13.

Accordingly, FIGS. 9–15 illustrate one embodiment of the method of the invention and the process steps associated therewith. However, it should be appreciated that the method of the invention is not limited to the processes shown in FIGS. 9–15.

FIGS. 2–8 show one illustrative embodiment of a system to implement the compression process as shown in FIGS. 9–12. However, it should be appreciated that the method of FIGS. 9–12 may be implemented on any of a wide variety of computers or operating systems. Additionally, it should be appreciated that the decompression process as described in conjunction with FIGS. 13–15 is not limited to the particular manner of implementation as shown in FIGS. 2–8. Rather, the decompression process may also be implemented on any of a wide variety of computers or operating systems.

In accordance with the embodiment of the system and method of the invention, a two-dimensional image is compressed and decompressed. However, it should be appreciated that the invention is not necessarily limited to processing two-dimensional images. For example, the method of the invention may be used to compress and decompress a three-dimensional image. This might include the processing of a holographic image, for example. In such processing in accordance with the invention, a slice would be formed from an array of pixels h*w*d, where "d" is the depth of the slice, for example.

Further, the above described embodiment of the system and method of the invention utilizes a K cache address in the cache memory. That is, the K cache address is checked under certain circumstances to determine if duplicate entries are present in the cache memory. In turn, these duplicate entries are used to enhance the processing speed of repeating sequences in a source image. However, it should be appreciated that the invention does not require the use of the K cache address. For example, the K cache address might not be used in a certain operating system if the operating capabilities of that component are insufficient. In the situation when the use of the K cache address is not necessary or desirable, in each of the processes described above, the K cache address may always be assumed to match the 0 cache address, for example.

It will therefore be readily understood by those persons skilled in the art that the present invention is susceptible to a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention.

Accordingly, while the present invention has been described herein in detail in relation to its exemplary embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims.

What is claimed is:

1. A method for compressing an image, the image including pixels arranged along a plurality of raster lines, the method comprising the steps of:
dividing select pixels in the image into a plurality of slices, the slices including pixels positioned adjacent to one another;
representing each slice in the form of an input slice-value;
comparing each input slice-value to determine if the input slice-value corresponds to a memory slice-value in a memory store; and
generating an output based on the comparing, the generating resulting in a compressed image.

2. The method of claim 1, wherein the memory store is a cache memory.

3. The method of claim 1, wherein the step of generating an output includes the step of outputting at least one of an output slice-value and an output encoded-value.

4. The method of claim 3, wherein the generating step includes:
generating an output slice-value if the input slice-value does not correspond to a memory slice-value in a memory store; and
generating an output encoded-value if the input slice-value does correspond to a memory slice-value in a memory store.

5. The method of claim 1, wherein generating an output based on the comparing includes the output being a least partially a series of repeating values, the output being further processed with run-length encoding.

6. The method of claim 1, wherein each slice is a two-dimensional array of pixels.

7. The method of claim 6, wherein the two-dimensional array of pixels defines a rectangle, the rectangle possessing a width w and a height h.

8. The method of claim 1, wherein the memory store possesses a plurality of addresses including a lowest address, and wherein the step of comparing each input slice-value to determine if the input slice-value corresponds to a memory slice-value in a memory store includes determining if the corresponding memory slice-value is disposed at the lowest address in the memory store.

9. The method of claim 8, wherein if the corresponding memory slice-value is disposed at the lowest address in the memory store, then the comparing step further includes determining if a predetermined address above the lowest address in the memory store corresponds to the lowest address.

10. The method of claim 1, wherein the memory store possesses a plurality of addresses, and wherein the step of comparing each input slice-value to determine if the input slice-value corresponds to a memory slice-value in a memory store includes:
initially comparing each input slice value to a base cache-address, the location of the base cache-address determined in a previous comparison; and
comparing, if no match is found at the base cache-address, the input slice-value to the lowest address in the memory and moving upwards until a match is found.

11. The method of claim 10, wherein if no match is found in the memory store, then the step of generating an output including generating an output slice-value,
the method further including the step of storing the input slice value in the memory store, the storing including:
storing the input slice-value in the lowest address in the memory store while shifting the content of the memory store upwards; and
assigning the lowest address in the memory store as the base cache-address, the base cache-address being the first address that the comparing process will compare in processing a next input slice-value.

12. The method of claim 10, wherein if a match is found at the lowest address in the memory store, then the step of generating an output including generating an output encoded-value identifying the lowest address location, and the comparing step further includes determining if a predetermined address above the lowest address in the memory store corresponds to the lowest address, and if the predetermined address above the lowest address does not match the lowest address, then
the method further including the step of storing the input slice value in the memory store, the storing including:
storing the input slice-value in the lowest address in the memory store while shifting the content of the memory store upwards; and
assigning the lowest address in the memory store as the base cache-address, the base cache-address being the first address that the comparing process will compare in processing a next input slice-value.

13. The method of claim 10, wherein if a match is found at the lowest address in the memory store, then the step of generating an output including generating an output encoded-value identifying the lowest address location, and the comparing step further includes determining if a predetermined address above the lowest address in the memory store corresponds to the lowest address, and if the predetermined address above the lowest address does match the lowest address, then
the method further including the step of assigning the lowest address in the memory store as the base cache-address, the base cache-address being the first address that the comparing process will compare in processing a next input slice-value.

14. The method of claim 10, wherein if a match is found but not at the lowest address in the memory store, then the step of generating an output including generating an output encoded-value identifying the address location of the match, and
the method further including the step of moving the matching slice-value in the memory store, the moving including:
moving the matching slice-value in the memory store to the lowest address in the memory store; and
moving all the contents of all addresses in the memory which are lower than the matching address up one address; and
assigning the matching address in the memory store as the base cache-address, the base cache-address being the first address that the comparing process will compare in processing a next input slice-value.

15. The method of claim 1, wherein the memory store possesses a plurality of addresses and the method for compressing an image further includes subsequently decompressing the compressed image, the decompressing including:
reading an item from the compressed image, the item being one of a slice-value or an encoded-value which represents an address location in the memory store, and if the item is an encoded-value; then
using the encoded-value to read a slice-value from the memory store.

16. The method of claim 15, wherein if the item is a slice-value, then the step of decompressing further including;

reassembling a reconstructed image slice based on the slice-value;

outputting the reconstructed image slice; and storing the slice-value read from the compressed image in the lowest address in the memory store while shifting the content of the memory store upwards.

17. The method of claim 15, wherein if the item is an encoded-value and the encoded-value corresponds to the lowest address in the memory store, then the step of decompressing further including;

reassembling a reconstructed image slice based on the slice-value read from the memory store based on the encoded-value;

outputting the reconstructed image slice; and determining if a predetermined address above the lowest address in the memory store corresponds to the lowest address, and if the predetermined address above the lowest address does match the lowest address, then maintaining the content of the memory store.

18. The method of claim 15, wherein if the item is an encoded-value and the encoded-value corresponds to the lowest address in the memory store, then the step of decompressing further including;

reassembling a reconstructed image slice based on the slice-value read from the memory store based on the encoded-value;

outputting the reconstructed image slice; and determining if a predetermined address above the lowest address in the memory store corresponds to the lowest address, and if the predetermined address above the lowest address does not match the lowest address, then storing the slice-value read from the memory store in the lowest address in the memory store while shifting the content of the memory store upwards.

19. The method of claim 15, wherein if the item is an encoded-value and the encoded value does not correspond to the lowest address in the memory store, then the step of decompressing further including;

reassembling a reconstructed image slice based on the slice-value read from the memory store based on the encoded-value;

outputting the reconstructed image slice; and storing the slice-value read from the memory in the lowest address in the memory store while shifting the content of the memory store upwards.

20. The method of claim 15, wherein the memory store is initialized similarly before compressing and decompressing an image, and wherein information regarding the content of the memory store in the compression process is not needed in the decompression process.

21. An apparatus for compressing an image, the image including pixels arranged along plurality of raster lines, the apparatus comprising:

means for dividing select pixels in the image into a plurality of slices, the slices including pixels positioned adjacent to one another;

means for representing each slice in the form of an input slice-value;

means for comparing each input slice-value to determine if the input slice-value corresponds to a memory slice-value in a memory store; and means for generating an output based on the determination of whether the input slice-value corresponds to a memory slice-value in a memory store, the output forming data of a compressed image.

22. The apparatus according to claim 21, wherein the output is in the form of at least a portion of repeating values.

23. The apparatus according to claim 21, wherein the output is further processed using run-length encoding.

24. The apparatus according to claim 21, wherein the memory store is a cache memory.

25. The apparatus according to claim 21, wherein the means for generating an output outputs at least one of an output slice-value and an output encoded-value; and wherein:

the means for generating an output generates an output slice-value if the input slice-value does not correspond to a memory slice-value in a memory store; and the means for generating an output generates an output encoded-value if the input slice-value does correspond to a memory slice-value in a memory store.

* * * * *